US010185495B2

(12) United States Patent
Katsuki

(10) Patent No.: US 10,185,495 B2
(45) Date of Patent: Jan. 22, 2019

(54) BLOCK STORAGE DEVICE HAVING HIERARCHICAL DISKS WITH DIFFERENT ACCESS FREQUENCIES

(71) Applicant: NEC CORPORATION, Tokyo (JP)

(72) Inventor: Yoshiyuki Katsuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 15/409,052

(22) Filed: Jan. 18, 2017

(65) Prior Publication Data

US 2017/0212691 A1 Jul. 27, 2017

(30) Foreign Application Priority Data

Jan. 21, 2016 (JP) .................................. 2016-009904

(51) Int. Cl.
*G06F 12/08* (2016.01)
*G06F 3/06* (2006.01)

(52) U.S. Cl.
CPC ............ *G06F 3/0608* (2013.01); *G06F 3/065* (2013.01); *G06F 3/0619* (2013.01); *G06F 3/0641* (2013.01); *G06F 3/0667* (2013.01); *G06F 3/0685* (2013.01)

(58) Field of Classification Search
CPC ...... G06F 3/0619; G06F 3/065; G06F 3/0667; G06F 3/0641; G06F 3/0685
USPC ......................................... 711/117, 162, 165
See application file for complete search history.

(56) References Cited

U.S. PATENT DOCUMENTS

| 2012/0131196 A1* | 5/2012 | Yamada | ............... | G06F 11/3485 709/226 |
| 2014/0189236 A1* | 7/2014 | Li | ........................... | G06F 3/061 711/114 |
| 2016/0179420 A1* | 6/2016 | Mei | ....................... | G06F 3/0619 711/162 |

FOREIGN PATENT DOCUMENTS

| JP | 2012-063902 A | 3/2012 |
| JP | 2012-141739 A | 7/2012 |
| JP | 2013-047933 A | 3/2013 |
| JP | 2013-137630 A | 7/2013 |
| JP | 2013-222230 A | 10/2013 |
| JP | 2015-179422 A | 10/2015 |

* cited by examiner

*Primary Examiner* — Pierre Miche Bataille
(74) *Attorney, Agent, or Firm* — Sughrue Mion, PLLC

(57) ABSTRACT

A first block storage device sharing an object storage device with a second block storage device has: plural kinds of physical devices having different access response performances; and a hierarchical logical disk created by using the storage areas of the physical devices and the storage area of the object storage device. When the access frequency of a logical block stored in a hierarchy one level above a lowest hierarchy falls below a threshold, the first block storage device searches the object storage device for a logical block having the hash of the logical block as a content address. When the search fails, the first block storage device transmits the logical block to the object storage device to change a hierarchy to store the logical block to the lowest hierarchy, whereas when the search succeeds, omits the transmission and changes a hierarchy to store the logical block to the lowest hierarchy.

8 Claims, 26 Drawing Sheets

FIG. 7

| LOGICAL ADDRESS | HIERARCHY ADDRESS | HIERARCHY NUMBER | CAS FLAG | ACCESS FREQUENCY |
|---|---|---|---|---|
| 00000000 | 00000000 | 0 | 0 | 0 |
| 00001000 | 00001000 | 1 | 0 | 1 |
| 00002000 | 00002000 | 0 | 0 | 3 |
| 00003000 | 00000000 | 1 | 0 | 0 |
| 00004000 | 00003000 | 0 | 0 | 1 |
| 00005000 | 00002000 | 1 | 0 | 1 |
| 00006000 | 00003000 | 1 | 0 | 1 |
| 00007000 | 00004000 | 1 | 0 | 0 |
| : | : | : | : | : |
| 00100000 | 00000000 | 3 | 1 | 0 |

FIG. 8

| HIERARCHY NUMBER | HIERARCHICAL DEVICE |
|---|---|
| 0 | SSD |
| 1 | SAS |
| 2 | CAS |
| : | : |

FIG. 9

| HIERARCHY ADDRESS | DEVICE ADDRESS | SIGNIFICANT BIT |
|---|---|---|
| 00000000 | 00000000 | 0 |
| 00001000 | 00100000 | 0 |
| 00002000 | 00020000 | 1 |
| 00003000 | 00001000 | 1 |
| 00004000 | 00300000 | 0 |
| : | : | : |

FIG. 10

| HIERARCHY ADDRESS | DEVICE ADDRESS | CA | SIGNIFICANT BIT |
|---|---|---|---|
| 00000000 | 00000000 | aad00exfdsdddbew | 1 |
| 00001000 | 00101000 | kttfadajeei235di | 1 |
| 00002000 | 00021000 | pqafdj2a3sejf69i | 1 |
| 00003000 | 00003000 | — | 1 |
| 00004000 | 00302000 | — | 1 |
| : | : | : | : |

FIG. 11

| HIERARCHY ADDRESS | CA | STORAGE DESTINATION CLOUD | BACKUP STORAGE | SIGNIFICANT BIT |
|---|---|---|---|---|
| 00000000 | aad00exfdsdddbew | 0 | 1 | 1 |
| 00001000 | kolfadajfeionnai | 0 | 2 | 1 |
| 00002000 | kdafdafklsejf03 | 0 | 1 | 0 |
| : | : | : | : | : |

FIG. 12

| CA | STORAGE NAME |
|---|---|
| sajfkdsaioppkjkl | diskarray1 |
| 9lelkldjaf329doe | diskarray1 |
| 1kslepmjvcklsd0e | diskarray2 |
| : | : |

FIG. 13

| HIERARCHICAL LOGICAL DISK NUMBER | ACCESS FREQUENCY UPDATE INTERVAL (s) | HIERARCHY CHANGE INTERVAL (s) |
|---|---|---|
| 0 | 1800 | 3600 |
| 1 | 7200 | 14400 |
| : | : | : |

BLOCK STORAGE DEVICE HAVING HIERARCHICAL DISKS WITH DIFFERENT ACCESS FREQUENCIES

INCORPORATION BY REFERENCE

This application is based upon and claims the benefit of priority from Japanese patent application No. 2016-009904, filed on Jan. 21, 2016, the disclosure of which is incorporated herein in its entirety by reference.

TECHNICAL FIELD

The present invention relates to a block storage device, a storage system, a computer system, a block storage control method, and a program.

BACKGROUND ART

Data volume is increasing every day, and a large amount of information is stored into storage devices. As block storage, such storage has appeared that logical disks are configured by hierarchically configuring physical disks with different performances, frequently accessed data are placed on a nonvolatile memory and less frequently accessed data are placed on a low-speed disk to be able to respond with a close level of performance to a nonvolatile memory at less cost. The abovementioned performance is access response performance (access speed). Further, there is a technique which compresses identical data held by a plurality of users and backup data by using the deduplication technique. Furthermore, a service provided with a function of CAS (Content Addressable Storage) as a cloud storage service has become general.

Also, such a storage system has been proposed that combines block storage and object storage to be able to store data of amount exceeding the specifications of a storage device included by the block storage. Object storage is a kind of storage which manages data by data units called objects. Object storage allows access to an object based on information unique to the object without designation of a directory in a hierarchical directory structure. An example of such block storage and storage systems is disclosed in Patent Document 1.

Block storage disclosed in Patent Document 1 collects a predetermined number of blocks with lower access frequency than a threshold, transmits the blocks to object storage, and deletes the transmitted blocks from the block storage.

Further, following techniques are proposed in relation to the present invention.

Patent Document 2 discloses a system which is composed of a server and a plurality of storage and performs data deduplication. Patent Document 2 also discloses calculating data access frequency, regularly moving data with low access frequency to a lower hierarchy, and moving data with low access frequency to other storage.

Patent Document 3 discloses a storing backup image of data stored in an auxiliary storage device of an information processing device, into an external device connected to the information processing device.

Patent Document 4 discloses a technique which, under an environment including a single storage subsystem and a plurality of deduplication storage devices connected to the storage subsystem, prevents the same data from being stored into different deduplication storage devices.

Patent Document 5 discloses a technique including a server and an online storage service and storing data deduplicated on the server into the online storage service.

Patent Document 1: Japanese Unexamined Patent Application Publication No. JP-A 2015-179422
Patent Document 2: Japanese Unexamined Patent Application Publication No. JP-A 2013-222230
Patent Document 3: Japanese Unexamined Patent Application Publication No. JP-A 2013-137630
Patent Document 4: Japanese Unexamined Patent Application Publication No. JP-A 2013-047933
Patent Document 5: Japanese Unexamined Patent Application Publication No. JP-A 2012-141739
Patent Document 6: Japanese Unexamined Patent Application Publication No. JP-A 2012-063902

According to the technique disclosed in Patent Document 1, by combining block storage with object storage, a storage system which can store data of amount exceeding the specifications of a storage device included by the block storage can be realized. However, it has a problem that in a case where a plurality of block storage share single object storage, if the object storage does not have the deduplication function, the same data from the plurality of block storage are duplicated and stored into the object storage.

SUMMARY OF THE INVENTION

An object of the present invention is to provide block storage which solves the abovementioned problem, that is, the problem that in a case where a plurality of block storage share object storage without the deduplication function, the same data from the plurality of block storage are duplicated and stored into the object storage.

A block storage device according to an exemplary embodiment of the present invention is a first block storage device accessed by a first host computer and connected via a network to an object storage device shared with a second block storage device accessed by a second host computer, the first block storage device comprising:

plural kinds of physical devices having different access response performances;

a hierarchical logical disk composed of a plurality of logical blocks and created by using storage areas of the plural kinds of physical devices and a storage area of the object storage device, with the object storage device as a lowest hierarchy and the plural kinds of physical devices as a plurality of hierarchies above the lowest hierarchy;

a deduplication unit configured to, when access frequency of a logical block stored in a hierarchy one level above the lowest hierarchy is reduced to fall below a threshold, do a search of the object storage device for a logical block having a hash of the logical block with the reduced access frequency as a content address; and a hierarchy changing unit configured to, when the search fails, perform transmission of the logical block with the reduced access frequency to the object storage device and thereby change a hierarchy to store the logical block to the lowest hierarchy, whereas when the search succeeds, omit the transmission and change a hierarchy to store the logical block to the lowest hierarchy.

Further, a storage system according to another exemplary embodiment of the present invention includes:

the first block storage device described above; and
object storage storing data received from the first block storage device.

Further, a computer system according to another exemplary embodiment of the present invention includes:

the storage system described above; and a host computer which can access the storage device.

Further, a block storage control method according to another exemplary embodiment of the present invention is executed by a first block storage device accessed by a first host computer and connected via a network to an object storage device shared with a second block storage device accessed by a second host computer, the first block storage device comprising: plural kinds of physical devices having different access response performances; and a hierarchical logical disk composed of a plurality of logical blocks and created by using storage areas of the plural kinds of physical devices and a storage area of the object storage device, with the object storage device as a lowest hierarchy and the plural kinds of physical devices as a plurality of hierarchies above the lowest hierarchy, the block storage control method comprising:

when access frequency of a logical block stored in a hierarchy one level above the lowest hierarchy is reduced to fall below a threshold, doing a search of the object storage device for a logical block having a hash of the logical block with the reduced access frequency as a content address;

when the search fails, performing transmission of the logical block with the reduced access frequency to the object storage device and thereby changing a hierarchy to store the logical block to the lowest hierarchy; and when the search succeeds, omitting the transmission and change a hierarchy to store the logical block to the lowest hierarchy.

Further, a non-transitory computer-readable medium storing a program includes instructions for causing a computer to function as a deduplication unit and a hierarchy changing unit, the computer configuring a first block storage device accessed by a first host computer and connected via a network to an object storage device shared with a second block storage device accessed by a second host computer, the first block storage device comprising: plural kinds of physical devices having different access response performances; and a hierarchical logical disk composed of a plurality of logical blocks and created by using storage areas of the plural kinds of physical devices and a storage area of the object storage device, the object storage device being a lowest hierarchy, the plural kinds of physical devices being a plurality of hierarchies above the lowest hierarchy, the deduplication unit being configured to, when access frequency of a logical block stored in a hierarchy one level above the lowest hierarchy is reduced to fall below a threshold, do a search of the object storage device for a logical block having a hash of the logical block with the reduced access frequency as a content address, the hierarchy changing unit being configured to, when the search fails, perform transmission of the logical block to the object storage device and change a hierarchy to store the logical block to the lowest hierarchy, whereas when the search succeeds, omit the transmission and change a hierarchy to store the logical block to the lowest hierarchy.

Because the present invention has the abovementioned configurations, in a case where a plurality of block storage devices share an object storage device, even if the object storage device does not have the deduplication function, it can be prevented that the same data from the plurality of block storage devices are duplicated and stored into the object storage device.

BRIEF DESCRIPTION OF DRAWINGS

FIG. 7 is a diagram showing an example of a LD mapping table in the second exemplary embodiment of the present invention;

FIG. 8 is a diagram showing an example of a hierarchy management table in the second exemplary embodiment of the present invention;

FIG. 9 is a diagram showing an example of a hierarchy-0 mapping table in the second exemplary embodiment of the present invention;

FIG. 10 is a diagram showing an example of a hierarchy-1 mapping table in the second exemplary embodiment of the present invention;

FIG. 11 is a diagram showing an example of an external storage hierarchy mapping table in the second exemplary embodiment of the present invention;

FIG. 12 is a diagram showing an example of an external storage management table in the second exemplary embodiment of the present invention;

FIG. 13 is a diagram showing an example of a policy management table in the second exemplary embodiment of the present invention;

EXEMPLARY EMBODIMENT

Next, exemplary embodiments of the present invention will be described in detail with reference to the drawings.
[First Exemplary Embodiment]

Figure 1:
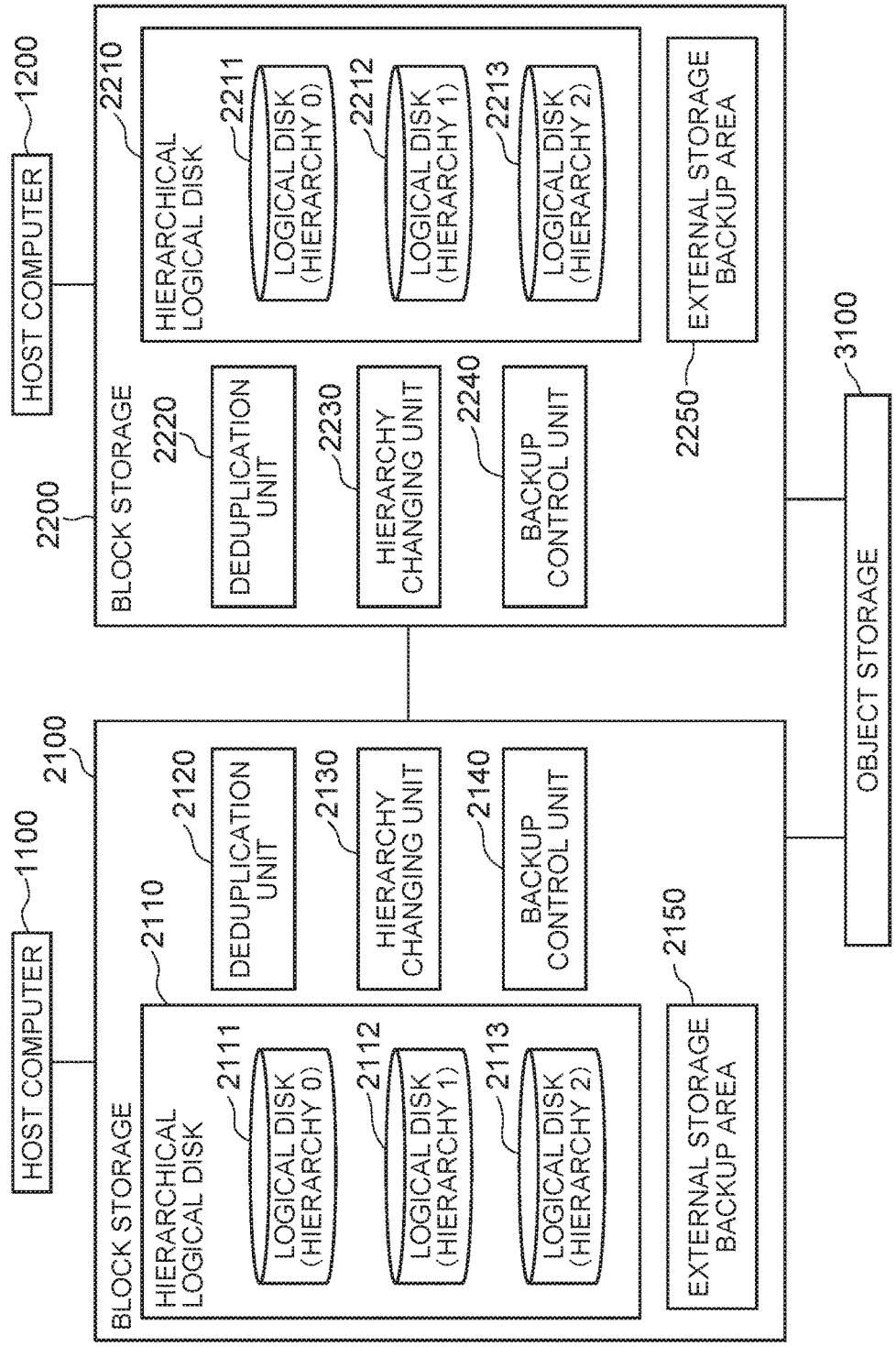
FIG. 1 is a block diagram of a computer system according to a first exemplary embodiment of the present invention.

FIG. 1 is a block diagram of a computer system according to this exemplary embodiment. Referring to FIG. 1, the computer system according to the first exemplary embodiment of the present invention includes two host computers 1100 and 1200, two block storage 2100 and 2200, and one object storage 3100. In this exemplary embodiment, the number of the object storage 3100 is one, but may be two or more. Moreover, the number of the block storage is two, but may be three or more.

The block storage 2100 has a hierarchical logical disk 2110, a deduplication unit 2120, a hierarchy changing unit 2130, a backup control unit 2140, and an external storage backup area 2150.

The hierarchical logical disk 2110 has hierarchized logical disks 2111 to 2113, and data is stored into any hierarchy of logical disk in accordance with its access frequency. The logical disk 2111 is a hierarchy-0 logical disk which, in a case where access frequency is divided into three hierarchies of high, middle and low, holds data with high frequency by blocks, and is configured by a SSD (Solid State Drive), for example. The logical disk 2112 is a hierarchy-1 logical disk which holds data with middle access frequency by blocks, and is configured by SAS (Serial Attached SCSI) storage, for example. The logical disk 2113 is a hierarchy-2 logical disk which holds data with low access frequency by blocks, and is configured by the object storage 3100. In this exemplary embodiment, the hierarchical logical disk 2100 has three hierarchies, but may have any number of hierarchies as far as two or more.

To be specific, the block storage 2100 includes plural kinds of physical devices with different access response performances, such as SSD and SAS. In general, a physical device with higher access response performance is assigned to (positioned as) a higher hierarchy. The hierarchical logical disk 2110, with the object storage 3100 as the lowest hierarchy and the plural kinds of physical devices included by the block storage 2100 as higher hierarchies than the lowest hierarchy, is created by using the storage areas of the plural kinds of physical devices and the storage area of the object storage 3100. The hierarchical logical disk 2110 is configured by a plurality of blocks (logical blocks) of predetermined size. Update and reference of data in the logical blocks configuring the hierarchical logical disk 2110 are actually equivalent to update and reference in blocks of the physical disks configuring the hierarchical logical disk 2110. Collection of the logical blocks configured by the hierarchy-0 physical device corresponds to the hierarchy-0 logical disk 2111. Collection of the logical blocks configured by the hierarchy-1 physical device corresponds to the hierarchy-1 logical disk 2112. Collection of the logical blocks configured by the hierarchy-2 physical device (the object storage 3100) corresponds to the hierarchy-2 logical disk 2113.

The external storage backup area 2150 is a backup area corresponding to the hierarchy-2 logical disk of the other block storage 2200, and is configured by CAS. That is, the logical disk 2113 is made to be redundant by using two storages, namely, the object storage 3100 and an external storage backup area 2250 of the other block storage 2200.

The object storage 3100 is storage which is shared by the block storage 2100 and the block storage 2200, and is configured by cloud storage, for example. The object storage 3100 may have the deduplication function or may not have the deduplication function.

The host computer 1100 is a computer which can access the block storage 2100, and is configured by a business server, for example.

The deduplication unit 2120 has a function to, when the access frequency of data stored on the logical disk 2112 in the hierarchy one level above the lowest hierarchy falls below a threshold, search the object storage 3100 for data having the hash of the abovementioned data as a content address. A method of calculating the hash of data may be any method as far as it is a previously determined method. The deduplication unit 2120 also has a function to search the external storage backup area 2250 of the other block storage 2200 for data having the abovementioned content address.

The hierarchy changing unit 2130 has a function to, when the abovementioned search on the object storage 3100 by the deduplication unit 2120 fails, that is, when data having the abovementioned content address is not stored in the object storage 3100, transmit the data to the object storage 3100 and change a hierarchy to store the data from the hierarchy-1 logical disk 2112 to the hierarchy-2 logical disk 2113. On the other hand, the hierarchy changing unit 2130 has a function to, when the search succeeds, that is, when data having the content address is stored in the object storage 3100, omit the operation of transmitting the data to the object storage 3100 and change a hierarchy to store the data from the hierarchy-1 logical disk 2112 to the hierarchy-2 logical disk 2113. Along with the abovementioned change, the hierarchy changing unit 2130 deletes the data moved to the hierarchy 2 from the hierarchy-1 logical disk 2112.

Further, the hierarchy changing unit 2130 has a function to, when the search on the external storage backup area 2250 by the deduplication unit 2120 fails, that is, when data having the abovementioned content address is not stored in the external storage backup area 2250 of the other block storage 2200, transmit the data to the block storage 2200 in order to store it into the external storage backup area 2250.

The backup control unit 2140 has a function to convert data received from the block storage 2200 into data called an object and store the hash of the data as a content address into the external storage backup area 2150. The backup control unit 2140 also has a function to, upon receiving a search request with a content address designated from the other block storage 2200, search the external storage backup area 2150 for data having the content address and return the search result to the request source. The backup control unit 2140 also has a function to, when failing in the search, search for data which is stored in the hierarchy-1 logical disk 2112 and whose hash coincides with the content address designated in the retrieval request and reduce the access frequency of the found data.

The host computer 1200, which is a computer capable of accessing the block storage 2200, is formed of a business server, for example. The block storage 2200 has the same function as the block storage 2100. A hierarchical logical disk 2210, a deduplication unit 2220, a hierarchy changing unit 2230, a backup control unit 2240, and an external storage backup unit 2250 have the same functions the hierarchical logical disk 2110, the deduplication unit 2120, the hierarchy changing unit 2130, the backup control unit 2140, and the external storage backup unit 2150. Logical disks 2211 to 2213 have the same functions as the logical disks 2111 to 2113.

The block storage 2100, 2200 has a function to read data that the host computer 1100, 1200 requests to read from a logical disk of proper hierarchy of the hierarchical logical disk 2110, 2210 and output it to the request source host computer 1100, 1200. Also, the block storage 2100, 2200 has a function of writing data that the host computer 1100, 1200 requests to write, into a logical disk of proper hierarchy of the hierarchical logical disk 2110, 2210. Because these functions are well known and are not directly related with the present invention, a detailed description thereof will be omitted.

Figure 2:
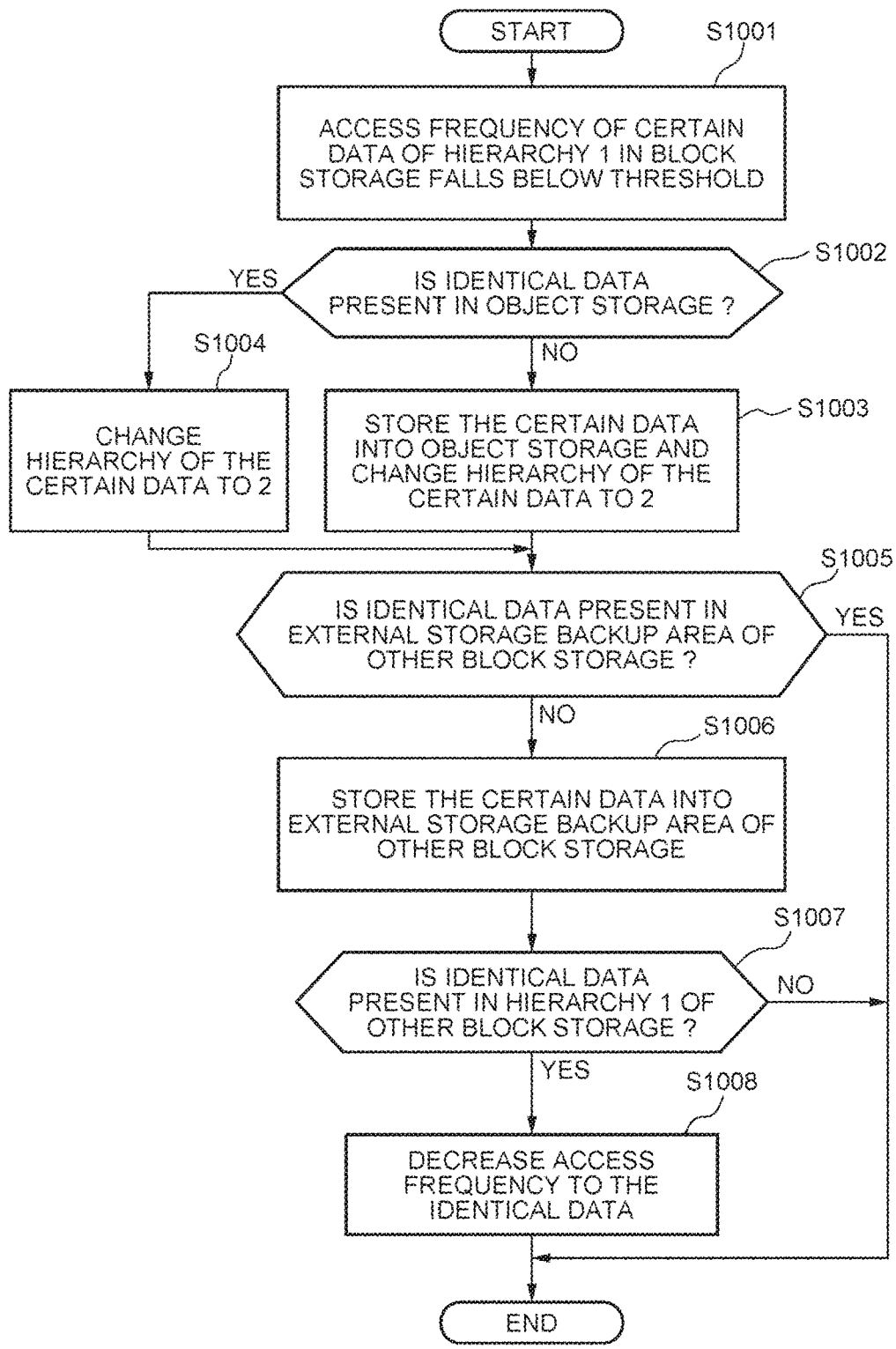
FIG. 2 is a flowchart showing the operation of the computer system according to the first exemplary embodiment of the present invention.
Figure 3:
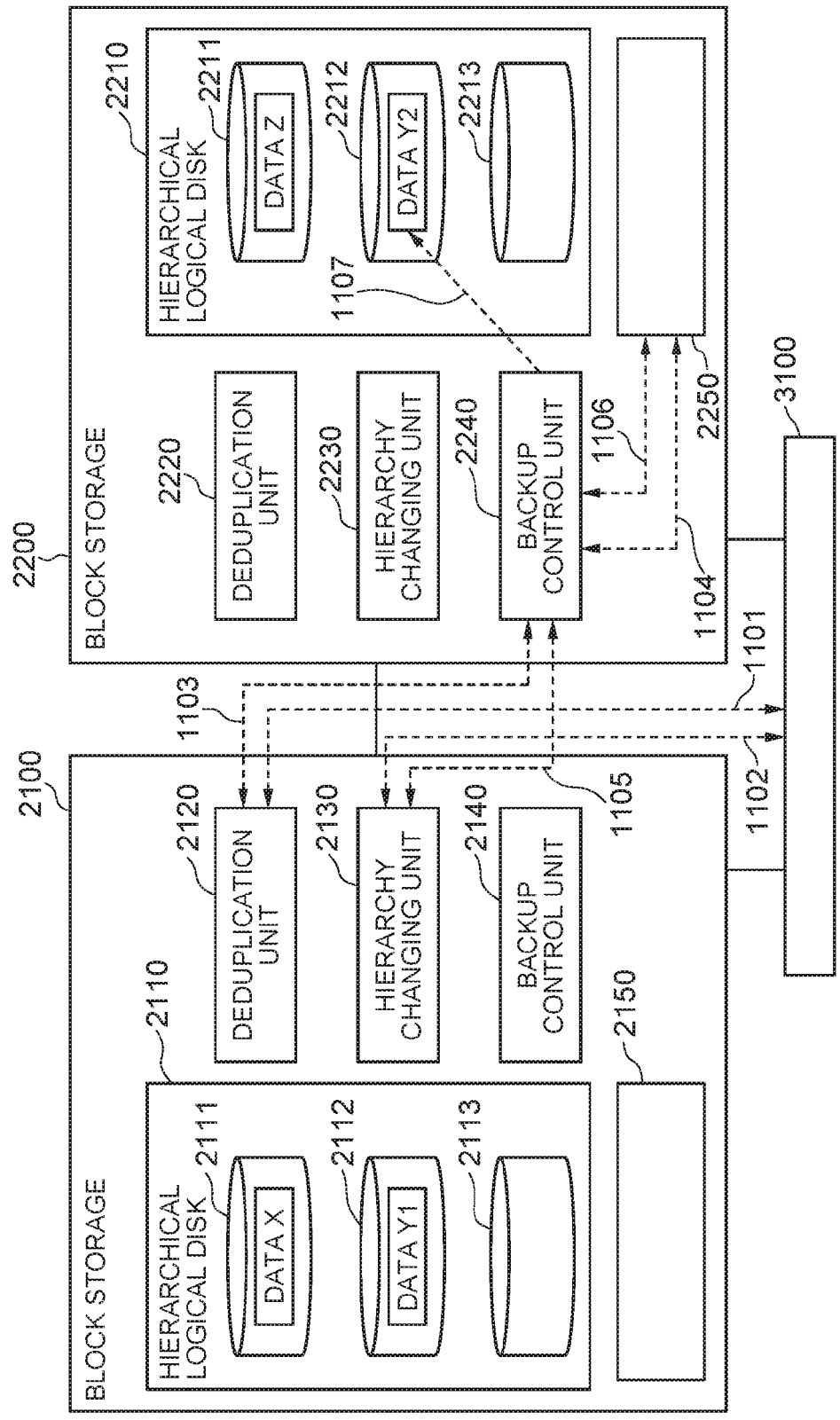
FIG. 3 is a conceptual diagram showing an example of location of data in the computer system according to the first exemplary embodiment of the present invention.
Figure 4:
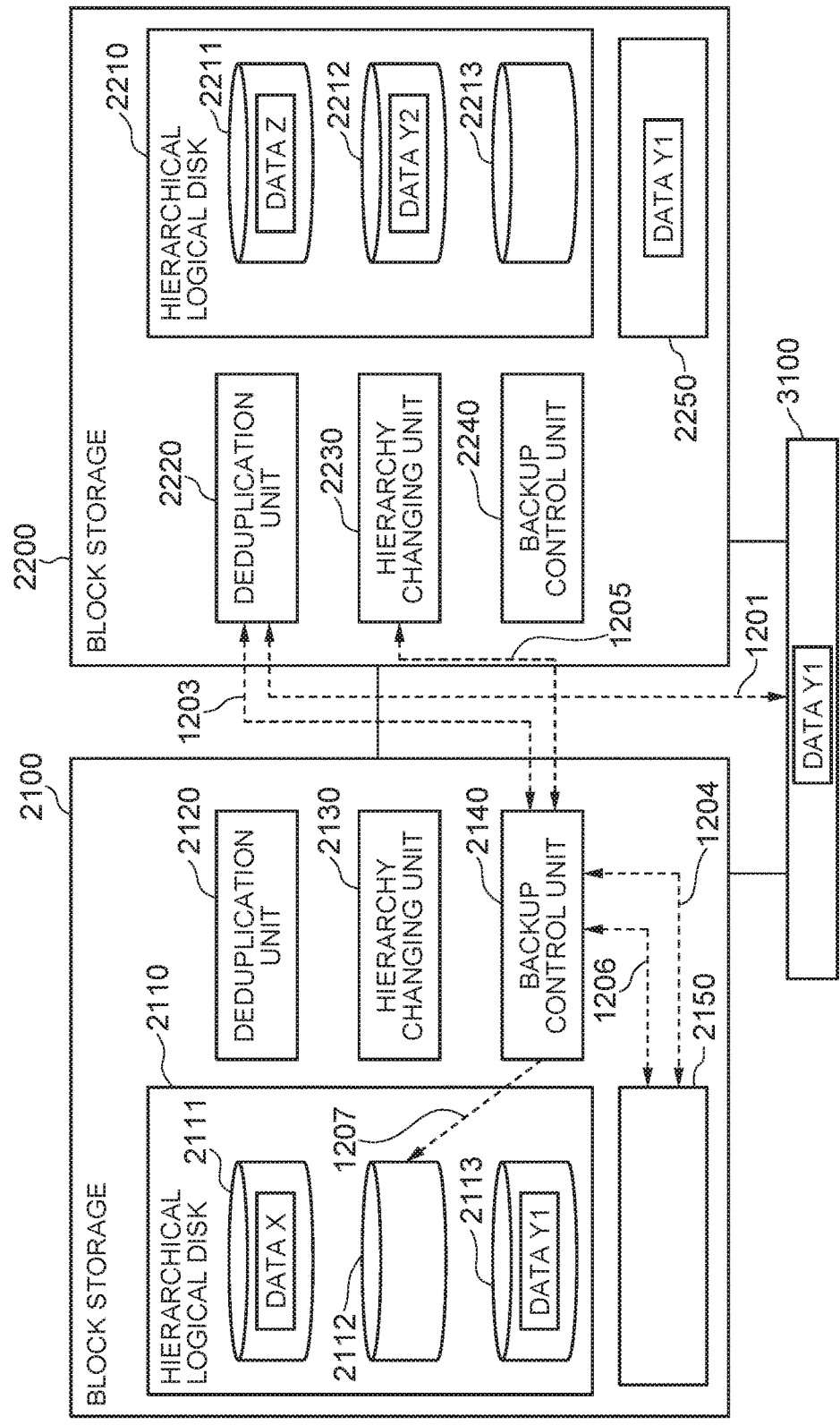
FIG. 4 is a conceptual diagram showing an example of location of data in the computer system according to the first exemplary embodiment of the present invention.
Figure 5:
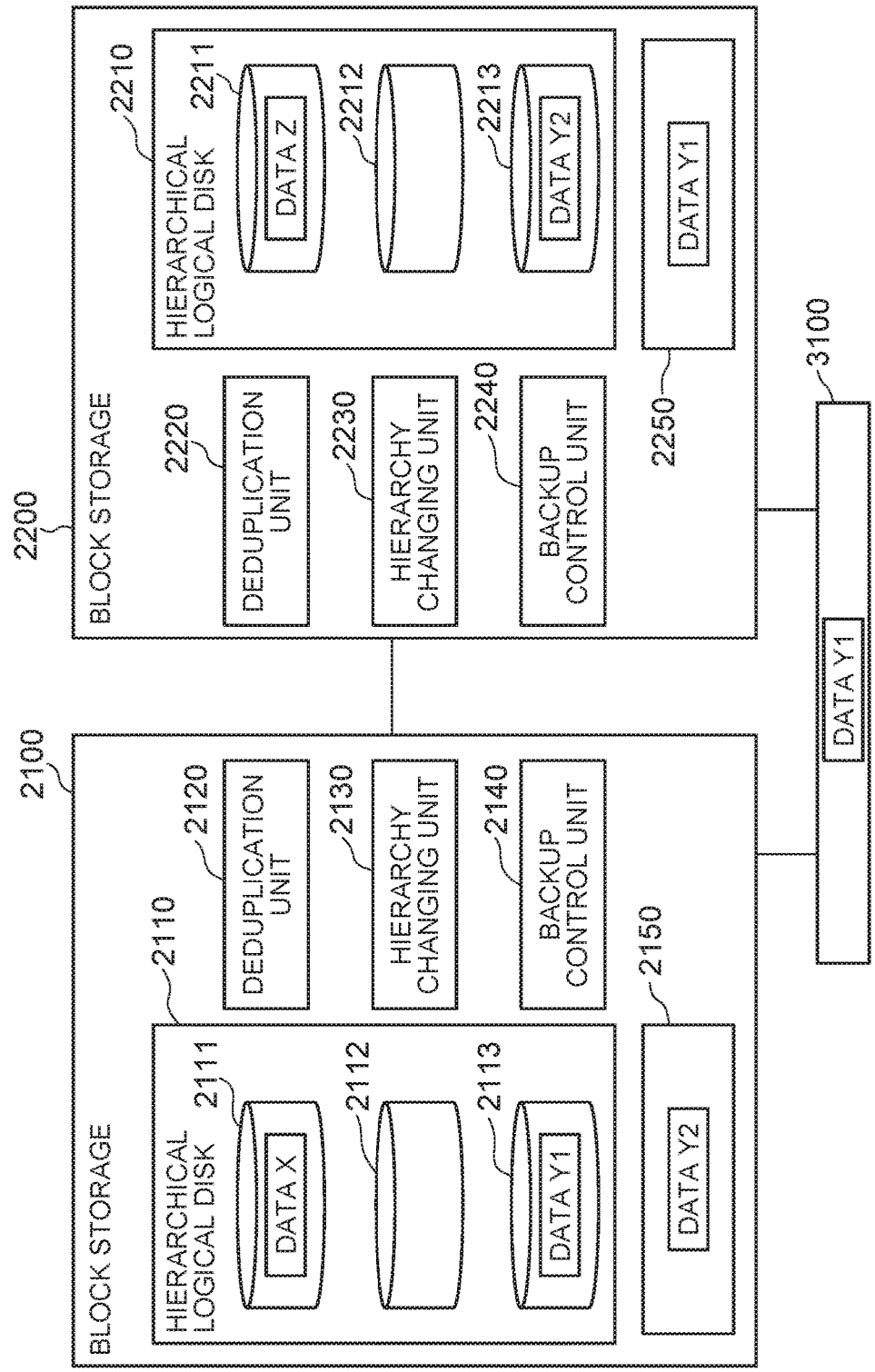
FIG. 5 is a conceptual diagram showing an example of location of data in the computer system according to the first exemplary embodiment of the present invention.

FIG. 2 is a flowchart showing the overview of the operation of the computer system according to this exemplary embodiment. FIGS. 3 to 5 are conceptual diagrams showing examples of location of data in the computer system according to this exemplary embodiment. Below, the operation of the computer system according to this exemplary embodiment will be described with reference to FIGS. 1 to 5.

We assume, as shown in FIG. 3, data X and data Y1 are stored on the logical disk 2111 and the logical disk 2112 of the block storage 2100, respectively, and data Z and data Y2 are stored on the logical disk 2211 and the logical disk 2212 of the block storage 2200, respectively. Herein, the data Y1 and the data Y2 are, for example, data of the same content of one block. In other words, they are identical data. If, under this condition, the access frequency of the data Y1 falls below a threshold because the data Y1 has not been accessed by the host computer 1100 for a while, a process as shown in FIG. 2 is executed in this exemplary embodiment.

First, upon detecting the access frequency of the data Y1 falls below the threshold (step S1001), the deduplication unit 2120 of the block storage 2100 calculates a hash (y) of the data Y1 by a predetermined method and searches the object storage 3100 for data having the hash y as a content address (step S1002, reference numeral 1101 in FIG. 3). Under the condition shown in FIG. 3, identical data to the data Y1 is not stored in the object storage 3100, so that the search fails (NO at step S1002). Then, the hierarchy changing unit 2130 of the block storage 2100 transmits the data Y1 to the object storage 3100 and changes a hierarchy to store the data Y1 from the hierarchy 1 to the hierarchy 2, and the object storage 3100 converts the data Y1 into an object and stores it so as to be associated with the content address y (step S1003, reference numeral 1102 in FIG. 3).

Further, the deduplication unit 2120 searches the external storage backup area 2250 of the block storage 2200 for data having the content address y (step S1005). To be specific, the deduplication unit 2120 transmits a search request with the content address y designated to the backup control unit 2240 of the block storage 2200 (reference numeral 1103 in FIG. 3). The backup control unit 2240 searches the external storage backup area 2250 for data having the content address y (reference numeral 1104 in FIG. 3), and returns the search result to the request source. Under the condition shown in FIG. 3, identical data to the data Y1 is not stored in the external storage backup area 2250, so that the search fails (NO at step S1005). Then, the hierarchy changing unit 2130 of the block storage 2100 transmits the data Y1 to the block storage 2200 in order to store it into the external storage backup area 2250, and the backup control unit 2240 converts the received data Y1 into an object and stores it into the external storage backup area 2250 so as to be associated with the content address y (step S1006, reference numerals 1105 and 1106 in FIG. 3). Furthermore, the backup control unit 2240 searches the hierarchy-1 logical disk 2212 for data having the content address y (step S1007, reference numeral 1107 in FIG. 3). Under the condition shown in FIG. 3, the data Y2 which is identical to the data Y1 is stored on the hierarchy-1 logical disk 2212, so that the search succeeds (YES at step S1007). Accordingly, the backup control unit 2240 reduces the access frequency of the data Y2 by a predetermined amount (step S1008).

As the operation described above is performed, the data Y1 stored on the logical disk 2112 moves to the logical disk 2113 of a hierarchy one level below, and is stored into the object storage 3100 configuring the logical disk 2113 as shown in FIG. 4. Further, backup data thereof is stored into the external storage backup area 2250. Furthermore, the access frequency of the data Y2 stored in the logical disk 2212 decreases.

Next, assuming, under the condition shown in FIG. 4, the access frequency of the data Y2 falls below the threshold because the data Y2 has not been accessed by the host computer 1200 for a while or because the backup control unit 2240 has reduced the access frequency of the data Y2 as described with reference to FIG. 3, the process shown in FIG. 2 is executed again.

First, upon detecting the access frequency of the data Y2 falls below the threshold (step S1001), the deduplication unit 2220 of the block storage 2200 calculates a hash (y, which is the same as that of the data Y1) of the data Y2 by a predetermined method and searches the object storage 3100 for data having the hash y as a content address (step S1002, reference numeral 1201 in FIG. 4). Under the condition shown in FIG. 4, identical data Y1 to the data Y2 is stored in the object storage 3100, so that the search succeeds (YES at step S1002). Then, the hierarchy changing unit 2230 of the block storage 2200 omits transmission of the data Y2 to the object storage 3100 and changes a hierarchy to store the data Y2 from the hierarchy 1 to the hierarchy 2 (step S1004).

Further, the deduplication unit 2220 searches the external storage backup area 2150 of the block storage 2100 for data having the content address y (step S1005). To be specific, the deduplication unit 2220 transmits a search request with the content address y designated to the backup control unit 2140 of the block storage 2100 (reference numeral 1203 in FIG. 4). The backup control unit 2240 searches the external storage backup area 2150 for data having the content address y (reference numeral 1204 in FIG. 4), and returns the search result to the request source. Under the condition shown in FIG. 4, identical data to the data Y2 is not stored in the external storage backup area 2150, so that the search fails (NO at step S1005). Then, the hierarchy changing unit 2230 of the block storage 2200 transmits the data Y2 to the block storage 2100 in order to store it into the external storage backup area 2150, and the backup control unit 2140 converts the received data Y2 into an object and stores it into the external storage backup area 2150 so as to be associated with the content address y (step S1006, reference numerals 1205 and 1206 in FIG. 4). Furthermore, the backup control unit 2140 searches the hierarchy-1 logical disk 2112 for data having the content address y (step S1007, reference numeral 1207 in FIG. 4). Under the condition shown in FIG. 4, data identical to the data Y2 is not stored in the hierarchy-1 logical disk 2112, so that the process shown in FIG. 2 ends As the operation described above is performed, as shown in FIG. 5, the data Y2 stored in the logical disk 2212 moves to the logical disk 2213 of a hierarchy one level below, and is linked with the data Y1 stored in the object storage 3100 configuring the logical disk 2213. Further, backup data thereof is stored into the external storage backup area 2150.

Thus, according to this exemplary embodiment, in a case where the block storage 2100 and the block storage 2200 share the object storage 3100, it is possible to prevent the same data from the plurality of block storage 2100 and 2200 from being duplicated and stored in the object storage 3100 even if the object storage 3100 does not have the deduplication function.

This is because when the access frequency of data stored on the logical disk 2112 of a hierarchy one level above the lowest hierarchy falls below the threshold, the deduplication unit 2120 searches the object storage 3100, which corresponds to the logical disk 2113 of the lowest hierarchy and is shared by the plurality of block storage, for data having the hash of the abovementioned data as a content address, and the hierarchy changing unit 2130 transmits the abovementioned data to the object storage 3100 and changes a hierarchy to store the abovementioned data to the lowest hierarchy when the search fails, whereas omits the transmission and changes a hierarchy to store the abovementioned data to the lowest hierarchy when the search succeeds.

Further, according to this exemplary embodiment, in a case where the object storage 3100 has the deduplication function, it is possible to reduce the amount of data transferred between the block storage and the object storage, compared with a configuration utilizing the function to perform deduplication. This is because duplicate data of data already stored in the object storage is not transmitted from the block storage to the object storage.

Further, according to this exemplary embodiment, backup data of data stored in the object storage 3100 is stored in the external storage backup area 2150, 2250, so that if data cannot be loaded from the object storage 3100 due to any trouble, it is possible to load the data from the external storage backup area 2150, 2250.

Further, according to this exemplary embodiment, in a case where identical data to data that the block storage 2100 has evicted to the object storage 3100 is stored in the block storage 2200 as data of a higher hierarchy, it is possible to accelerate eviction of the data to the object storage 3100. This is because when receiving a search request with a content address designated from the block storage 2100, the backup control unit 2240 searches the external storage backup area 2250 for data having the content address and, when failing in the search, searches for data which is stored in the logical disk 2212 of a hierarchy one level above the lowest hierarchy and whose hash coincides with the content address, and reduces the access frequency of the found data.

[Second Exemplary Embodiment]
<Feature of This Exemplary Embodiment>

This exemplary embodiment has a configuration that block storage with the deduplication function and object storage with the CAS (Content Addressable Storage) function to provide cloud service are connected mutually. Moreover, this exemplary embodiment evicts data with low access frequency in operation data used by a host computer to the object storage. In this exemplary embodiment, before the eviction, it is checked whether or not the same data is already stored in the object storage and, if the same data is already stored, the operation of transmitting the data to be evicted to the object storage is omitted. This reduces the amount of data transferred to the object storage. Moreover, since the same data is not duplicated or stored in the object storage, the storage capacity of the object storage can be reduced and the storage cost of the storage can be reduced. Moreover, in this exemplary embodiment, in preparation for trouble of the object storage, the data stored in the object storage is stored into the backup area in the other related block storage. Consequently, the availability of data access increases.

<Problem to Be Solved in This Exemplary Embodiment>

There is a technique by which data of volume exceeding the specifications of the storage device of the block storage can be stored by using combination of the block storage having a hierarchized logical disk with the cloud storage (for example, see Patent Document 1). However, this technique provides only a function to individually evict data evicted from the block storage to the cloud storage. Consequently, the respective storage systems independently judge data to be transmitted to the cloud storage and transmit the data even in the case of the same data, there is a problem that useless communication cost and the storage cost of the storage are generated. Moreover, there is also a problem that in extracting data from the cloud storage, if the cloud storage is out of service, data cannot be searched.

Further, there is a technique to acquire, from a plurality of file storage devices, file information including information about the contents of files held by the respective file storage devices, and extract files having information about the same file content as a duplicate file (for example, see Patent Document 6). However, this technique targets at all the files, and has a problem that in performing deduplication of a frequently used file in real time, performance falls.

Further, there is a technique to realize enhancement of the capacity of a file server by utilizing cloud storage (for example, see Patent Document 5). However, this technique has a problem that the amount of communication of duplicate data between file servers and the storage capacity cannot be reduced because in a Kernel module which mounts a storage area on the online storage service, so that a file is divided into block files.

This exemplary embodiment provides a system which utilizes block storage with the deduplication function having a hierarchized logical disk and cloud storage and solves the abovementioned problems.

<Solution by This Exemplary Embodiment>

This exemplary embodiment has a configuration that a business server, a plurality of block storage, and cloud storage are connected mutually. The business server is a virtual server in which a physical server or a virtual OS operates. The block storage is storage in which a plurality of physical devices with different performances are hierarchized so as to be usable as one logical disk. The block storage uses the CAS function for the lowest hierarchy, in combination with the deduplication function.

This exemplary embodiment with the above configuration uses the hash of data as a content address (CA) and detects duplicate data by using the content address. Moreover, this exemplary embodiment performs detection of duplicate data across the plurality of block storage cooperating with each other. Moreover, this exemplary embodiment checks whether or not there is already the same data in the cloud storage shared by the plurality of block storage cooperating with each other, and thereby selects data to be actually evicted to the cloud storage. Moreover, this exemplary embodiment enables backup source block storage to grasp available disk capacity on a backup area which stores a backup of data stored in the object storage, thereby preventing storage of backup data exceeding the capacity of the backup area.

Further, in such a case that a plurality of block storage are used in the same or similar operation process, the priority of data (hereinafter, referred to as data X) evicted by certain block storage of the plurality of block storage to the cloud storage is thought to be low also in the other block storage. Thus, in this exemplary embodiment, the other block storage holding the same data X as the data X evicted by the certain block storage to the cloud storage reduces the access frequency of the data X held thereby in order to evict with priority.

Further, in this exemplary embodiment, an influence on the performance is reduced by limiting data to be held as a backup to data of the lowest hierarchy of block storage.

Further, in this exemplary embodiment, backup data stored in the backup area of the other block storage is searched instead of data stored in the cloud storage, so that communication from the block storage to the cloud storage does not arise, and it is possible to reduce the amount of communication.

<Configuration of This Exemplary Embodiment>

Next, the configuration of this exemplary embodiment will be described in detail with reference to the drawings.

Figure 6:
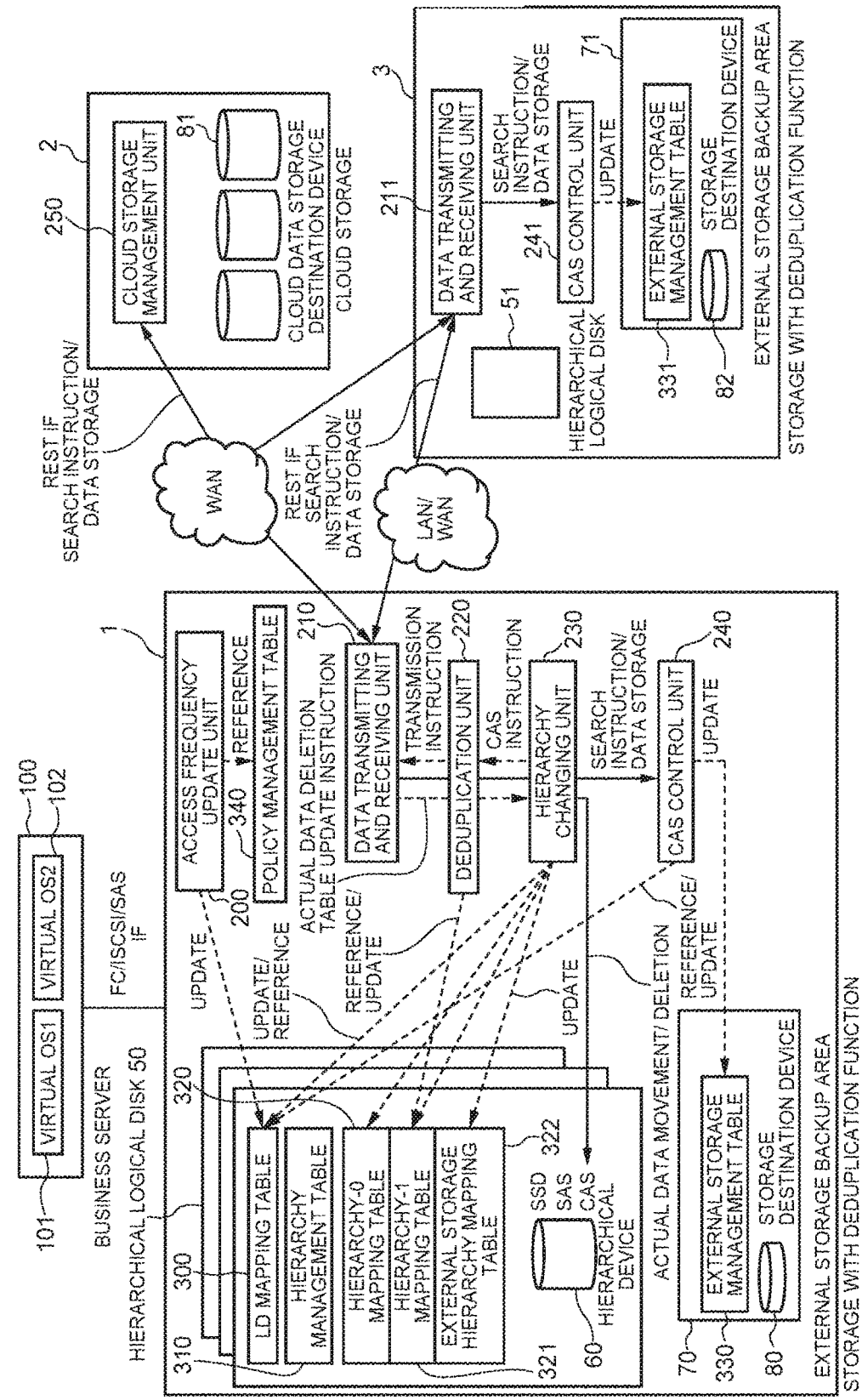
FIG. 6 is a block diagram of a computer system according to a second exemplary embodiment of the present invention.

Referring to FIG. 6, this exemplary embodiment is configured by block storage 1 with the deduplication function (hereinafter, simply referred to as the storage 1), cloud storage 2, block storage 3 with the deduplication function (hereinafter, simply referred to as the storage 3), and a business server 100. The business server 100 and the storage 1 are connected by FC, iSCSI, or SAS. The storage 1, the storage 3, and the cloud storage are connected by WAN (Wide Area Network). The storage 1 and the storage 3 are connected to a LAN (Local Area Network) within a local site or WAN.

The storage 1 has a hierarchical logical disk 50, an external storage backup area 70, an access frequency update unit 200, a data transmitting and receiving unit 210, a deduplication unit 220, a hierarchy changing unit 230, a CAS control unit 240, and a policy management table 340. The access frequency update unit 200 has a function to regularly update data access by the business server 100. The data transmitting and receiving unit 210 has a function to transmit and receive actual data and control information to and from the cloud storage 2 and the storage 3. The deduplication unit 220 has a function to perform deduplication of duplicate data. The hierarchy changing unit 230 has a function to change real data. The CAS control unit 240 has a function to convert actual data received from the other storage 3 into data called an object and store the data with the hash value of the data as a content address into the external storage backup area 70. The policy management table 340 has a function to store the setting of the hierarchical logical disk 50.

The cloud storage 2 has a cloud data storage destination device 81, and a cloud storage management unit 250. The cloud storage management unit 250 has a function to convert actual data received from the data transmitting and receiving unit 210 and a data transmitting and receiving unit 211 described later of the storage 3 into an object and store it into the could data storage destination device 81.

The storage 3 has an equivalent configuration to that of the storage 1. FIG. 6 shows only part of its components, that is, a hierarchical logical disk 51, an external storage backup area 71, the data transmitting and receiving unit 211, a CAS control unit 241, an external storage management table 331, and a storage destination device 82.

The business server 100 is formed of a physical server or a virtual server. In the case of a virtual server, one or more virtual OS 101 and 102 for realizing the virtual server operate.

The hierarchical logical disk 50 has a LD mapping table 300, a hierarchy management table 310, a hierarchy-0 mapping table 320, a hierarchy-1 mapping table 321, an external storage hierarchy mapping table 322, and a hierarchical device 60. On the LD mapping table 300, the primary address of the hierarchical logical disk 50 is stored. On the hierarchy management table 310, a hierarchy type is stored. On each of the mapping tables 320, 321 and 322 of the respective hierarchies, a secondary address is stored. In the hierarchical device 60, actual data is stored.

The external storage backup area 70 has an external storage management table 330 and a storage destination device 80. On the external storage management table 330, the CA of actual data backed up from the storage 3 is stored. In the storage destination device 80, actual data is stored. The storage destination device 80 is an area located on the lowest layer of a hierarchical device of the cooperating storage 3.

The access frequency update unit 200 has a function to, with reference to a policy management table 340, regularly issue operation instructions in accordance with an access frequency update interval of each hierarchical logical disk and a hierarchy change interval. The access frequency update unit 200 also has a function to update the access frequency of the LD mapping table 300 at the access frequency update intervals.

The data transmitting and receiving unit 210 transmits actual data or a search instruction to the cloud storage management unit 250 in accordance with a transmission instruction by the deduplication unit 220. Further, the data transmitting and receiving unit 210 transmits actual data or a search instruction to a CAS control unit 241 of the storage 3. Furthermore, the data transmitting and receiving unit 210 receives actual data from the storage 3, and issues an instruction to search or store the actual data to the CAS control unit 240. With such operation, it becomes possible to store backup data of the cooperating external storage 3 into the external storage backup area 70.

The deduplication unit 220 executes the following process upon receiving an instruction to manage data by data units called objects from the hierarchy changing unit 230. Hereinafter, the instruction to manage data by data units called objects will be referred to as CAS Instruction. First, the deduplication unit 220 calculates the CA of data in a designated area of the hierarchical logical disk, on which the CAS Instruction has been issued. Next, in a case where duplicate data is not stored in the storage 1, the deduplication unit 220 instructs the cloud storage management unit 250 to perform search to check whether identical data is present. This search instruction contains the calculated CA. Next, upon receiving the result of search based on the search instruction from the cloud storage management unit 250, in a case where the search result shows absence of identical same, the deduplication unit 220 instructs the data transmitting and receiving unit 210 to transmit data with the CA as a key.

Further, the deduplication unit 220 issues a search instruction to check whether identical data is present in the external storage backup area 71, to the CAS control unit 241 of the storage 3. In a case where identical data is not present in the end, the deduplication unit 220 instructs the data transmitting and receiving unit 210 to transmit data with the CA as a key, thereby storing backup data into the cooperating local storage 3. Further, the deduplication unit 220 regularly calculates the CA of the hierarchy-1 mapping table 321. The calculated CA is utilized to increase candidate data for eviction in the cloud storage 2.

The hierarchy changing unit 230 regularly refers to the LD mapping table 300 and moves data with low access frequency to a lower hierarchy. Upon determining data to move to the CAS hierarchy, the hierarchy changing unit 230 issues CAS Instruction on the data to the deduplication unit 220.

The CAS control unit 240, in accordance with a search instruction from the other storage 3 via the data transmitting and receiving unit 210, returns a search result showing whether or not target data is present in data stored in the external storage backup area 70. Moreover, in accordance with a data storage instruction from the other storage 3 via the data transmitting and receiving unit 210, the CAS control unit 240 stores received data into the backup area 70, and updates the external storage management table 330.

The cloud storage management unit 250, in accordance with a search instruction from the data transmitting and receiving unit 210 and the data transmitting and receiving unit 211, returns a search result showing whether or not target data is present in data already stored in the storage destination device 81. Moreover, in accordance with a data storage instruction from the data transmitting and receiving unit 210 and the data transmitting and receiving unit 211, the cloud storage management unit 250 stores received actual data into the storage destination device 81.

The LD mapping table 300 is an address table for accessing the hierarchical logical disk 50 from the business server 100. FIG. 7 shows an example of the LD mapping table 300. On the LD mapping table 300 shown in FIG. 7, a logical address, a hierarchy address, a hierarchy number, a CAS flag, and access frequency are recorded so as to be associated with each other. For example, on the third line of the LD mapping table 300 shown in FIG. 7, the logical address is 00002000, the hierarchy address is 00002000, the hierarchy number is 0, the CAS flag is 0, and the access frequency is 3. This represents that the logical address 00002000 is mapped so that actual data is stored into the hierarchy address 00002000 of the hierarchy 0, CAS has not been generated, and the access frequency is 3 (middle access frequency). The access frequency is incremented every time the corresponding logical address is accessed by the business server 100, and is regularly decremented by the access frequency update unit 200.

The hierarchy management table 310 is a table which associates a hierarchy with a physical device assigned to the hierarchy. FIG. 8 shows an example of the hierarchy management table 310. On the hierarchy management table 310 shown in FIG. 8, a hierarchy number and a hierarchical device are recorded so as to be associated with each other. For example, on the first line of the hierarchy management table 310 shown in FIG. 8, the hierarchy number is 0 and the physical device is SSD, so that SSD is assigned to the hierarchy 0. Further, for example, on the second line of the hierarchy management table 310, the hierarchy number is 1 and the physical device is SAS, so that SAS is assigned to the hierarchy 1. Further, for example, on the third line of the hierarchy management table 310, the hierarchy number is 2 and the physical device is CAS, so that CAS is assigned to the hierarchy 2.

The hierarchy-0 mapping table 320 is an address table for accessing a hierarchy-0 physical device in the hierarchical device 60 from the LD mapping table 300. FIG. 9 shows an example of the hierarchy-0 mapping table 320. On the hierarchy-0 mapping table 320 shown in FIG. 9, a hierarchy address of the hierarchy 0, a device address, and a significant bit are recorded so as to be associated with each other. For example, the first line of the hierarchy-0 mapping table 320 shown in FIG. 9 represents that the hierarchy address 00000000 of the hierarchy 0 is mapped to the device address 00000000 of the hierarchy-0 physical device and the significant bit is 0, that is, the hierarchy address 00000000 and the device address 00000000 of the hierarchy 0 are free.

The hierarchy-1 mapping table 321 is an address table for accessing a hierarchy-1 physical device in the hierarchical device 60 from the LD mapping table 300. FIG. 10 shows an example of the hierarchy-1 mapping table 321. On the hierarchy-1 mapping table 320 shown in FIG. 10, a hierarchy address of the hierarchy 1, a device address, CA, and a significant bit are recorded so as to be associated with each other. For example, on the first line of the hierarchy-1 mapping table 321 shown in FIG. 10, the hierarchy address is 00000000, the device address is 00000000, CA is aad00exfdsdddbew, and the significant bit is 1. This represents that the hierarchy address 00000000 of the hierarchy 1 is mapped to the device address of the hierarchy-1 physical device and is being used at present. It also represents that the CA of the actual data is aad00exfdsdddbew.

The external storage hierarchy mapping table 322 is an address table for accessing a physical device of the hierarchy 2 of the hierarchical device 60 from the LD mapping table 300. FIG. 11 shows an example of the external storage hierarchy mapping table 322. On the external storage hierarchy mapping table 322 shown in FIG. 11, a hierarchy address of the hierarchy 2, CA, a storage destination cloud, backup storage, and a significant bit are recorded so as to be associated with each other. For example, on the first line of the CAS hierarchy mapping table 322 shown in FIG. 11, the hierarchy address of the hierarchy 2 is 00000000, CA is aad00exfdsdddbew, the storage destination cloud is 0, the backup storage is 1, and the significant bit is 1. This represents that the hierarchy address 00000000 of the hierarchy 2 is mapped to CA=aad00exfdsdddbew, the storage destination cloud for the actual data is cloud storage identified with 0, and the backup destination for the actual data is backup storage identified with 1. As shown in FIG. 11, the external storage hierarchy mapping table 322 has a field of backup storage, so that it becomes possible to link backup data with the cooperating local storage.

The external storage management tables 330 and 331 are tables for managing storage having transmitted data (backup data) stored in the storage destination devices 80 and 82, respectively. FIG. 12 shows an example of the external storage management table 330. On the external storage management table 330 shown in FIG. 12, CA and a storage name are managed so as to be associated with each other. For example, on the first line of the external storage management table 330, CA is sajfkdsaioppkjkl, and the storage name is Diskarray1. This represents that data which has been transmitted from storage with the storage name Diskarray1 and whose CA is sajfkdsaioppkjkl is stored.

The policy management table 340 is a table for storing an access frequency update interval and a hierarchy change interval for each hierarchical logical disk 50. FIG. 13 shows an example of the policy management table 340. On the policy management table 340 shown in FIG. 13, a hierarchical logical disk number, an access frequency update interval, and a hierarchy change interval are recorded so as to be associated with each other. For example, on the first line of the policy management table 340 shown in FIG. 13, the hierarchical logical disk number is 0, the access frequency update interval is 1800 seconds, and the hierarchy change interval is 3600 seconds. This represents that the hierarchical logical disk 50 with the hierarchical logical disk number 0 updates the access frequency every 30 minutes and changes the hierarchy every 60 minutes.

<Operation of This Exemplary Embodiment>

Next, the operation of this exemplary embodiment will be described in detail.

Figure 14:
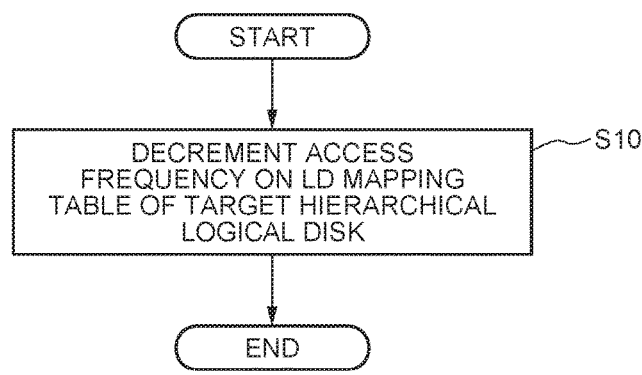
FIG. 14 is a flowchart showing the operation of an access frequency update unit in the second exemplary embodiment of the present invention.

FIG. 14 is a flowchart showing the operation of the access frequency update unit 200. Below, referring to FIG. 14, an operation by the access frequency update unit 200 to update the access frequency of the hierarchical logical disk 50 will be described.

The access frequency update unit 200 regularly executes the process shown in FIG. 14 on the basis of the access frequency update interval on the policy management table 340. The access frequency update unit 200 decrements all the access frequencies on the LD mapping table 300 of the target hierarchical logical disk 50 at one time (S10). Then, the access frequency update unit 200 ends the current process. For example, the access frequency update unit 200 decrements the access frequency on the LD mapping table 300 of the hierarchical logical disk 50 with the hierarchical logical disk number 0 every 1800 seconds.

Figure 15:
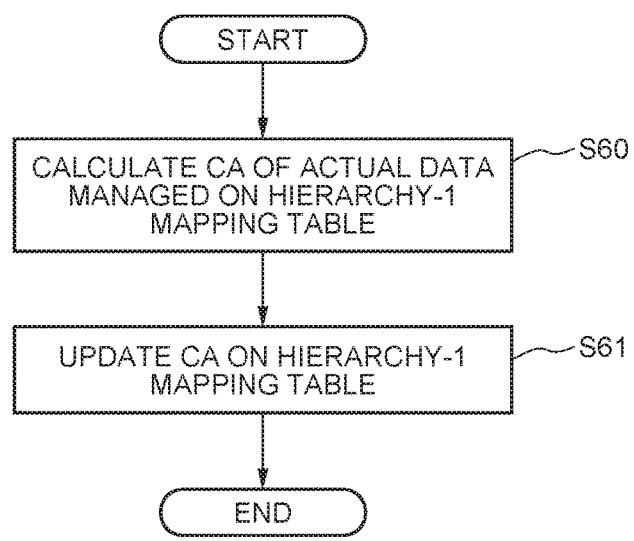
FIG. 15 is a flowchart showing the operation of a deduplication unit in the second exemplary embodiment of the present invention.

FIG. 15 is a flowchart showing part of the operation of the deduplication unit 220. Below, referring to FIG. 15, an operation of the deduplication unit 220 to add CA to the hierarchy-1 mapping table 321 will be described.

The deduplication unit 220 regularly executes the process shown in FIG. 15. The deduplication unit 220 calculates the CA of actual data managed on the hierarchy-1 mapping table 321 (step S60). Next, the deduplication unit 220 updates the CA of the hierarchy-1 mapping table 321 (step S61). Then, the deduplication unit 220 ends the current process. Such preliminary calculation of CA for managing, as an object, actual data managed by the hierarchy-1 mapping table 321 allows CA-based comparison of actual data managed by the hierarchy-1 mapping table 321 (this actual data is not managed as an object yet) with data already managed as an object and stored in the external storage.

Figure 16:
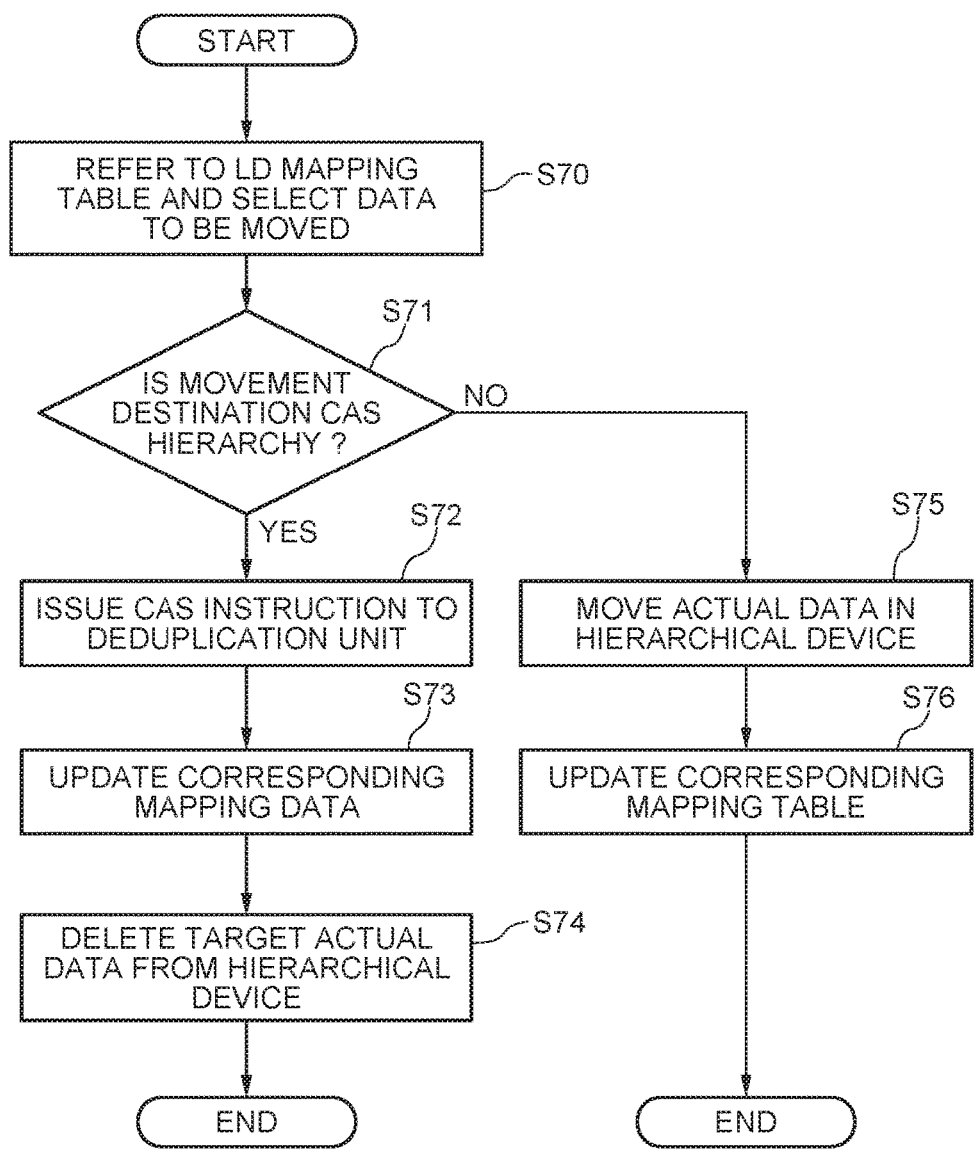
FIG. 16 is a flowchart showing the operation of a hierarchy changing unit in the second exemplary embodiment of the present invention.

FIG. 16 is a flowchart showing the operation of the hierarchy changing unit 230. Below, an operation of the hierarchy changing unit 230 to regularly move data with low access frequency to the other hierarchy will be described with reference to FIG. 16.

The hierarchy changing unit 230 regularly executes the process shown in FIG. 16 on the basis of the hierarchy change interval in the policy management table 340. First, the hierarchy changing unit 230 refers to the LD mapping table 300, and selects data to be moved on the basis of the access frequency (step S70). For example, the hierarchy changing unit 230 executes a process as described below focusing on each line of the LD mapping table 300. First, the hierarchy changing unit 230 determines a hierarchy number of a proper hierarchy on the basis of the access frequency on the focused line. For example, the hierarchy changing unit 230 designates the hierarchy number 0 when the access frequency is high, the hierarchy number 1 when the access frequency is middle, and the hierarchy number 2 when the access frequency is low. Next, the hierarchy changing unit 230 compares the designated hierarchy number with the hierarchy number on the focused line. In a case where the hierarchy numbers differ from each other, the hierarchy changing unit 230 selects data managed on the focused line as data to be moved. In this case, the designated hierarchy is a movement destination hierarchy. In a case where the hierarchy numbers coincide with each other, the hierarchy changing unit 230 does not select data managed on the focused line as data to be moved.

Next, in a case where the movement destination of the selected data to be moved is the CAS hierarchy (the hierarchy number 2) (YES at step S71), the hierarchy changing unit 230 issues CAS Instruction on the selected data to be moved to the deduplication unit 220 (step S72). The CAS Instruction contains the hierarchy address of the hierarchy 1. After that, on the basis of the result of the CAS Instruction, the hierarchy changing unit 230 updates the hierarchy address and hierarchy number on the LD mapping table 300 and the hierarchy address and significant flag on the hierarchy-1 mapping table 321, and adds a new entry for the data to be moved to the external storage hierarchy mapping table 322 (step S73). Further, after completion of the process executed on the basis of the CAS Instruction, the hierarchy changing unit 230 deletes the actual data on the hierarchy-1 mapping table 321 (step S74). Then, the hierarchy changing unit 230 ends the process shown in FIG. 16.

In a case where the movement destination of the selected data to be moved is not CAS hierarchy (NO at step S71), the hierarchy changing unit 230 moves the actual data to the hierarchical device 60 (step S75). As movement in a case where the movement destination is not the CAS hierarchy, movement from the hierarchy 0 to the hierarchy 1, movement from the hierarchy 2 to the hierarchy 1, and movement from the hierarchy 1 to the hierarchy 0 can be assumed. Then, depending on the movement, the hierarchy changing unit 230 updates the hierarchy-0 mapping table 320 and the hierarchy-1 mapping table 321 (step S76). The hierarchy changing unit 230 then ends the process shown in FIG. 16.

Figure 17:
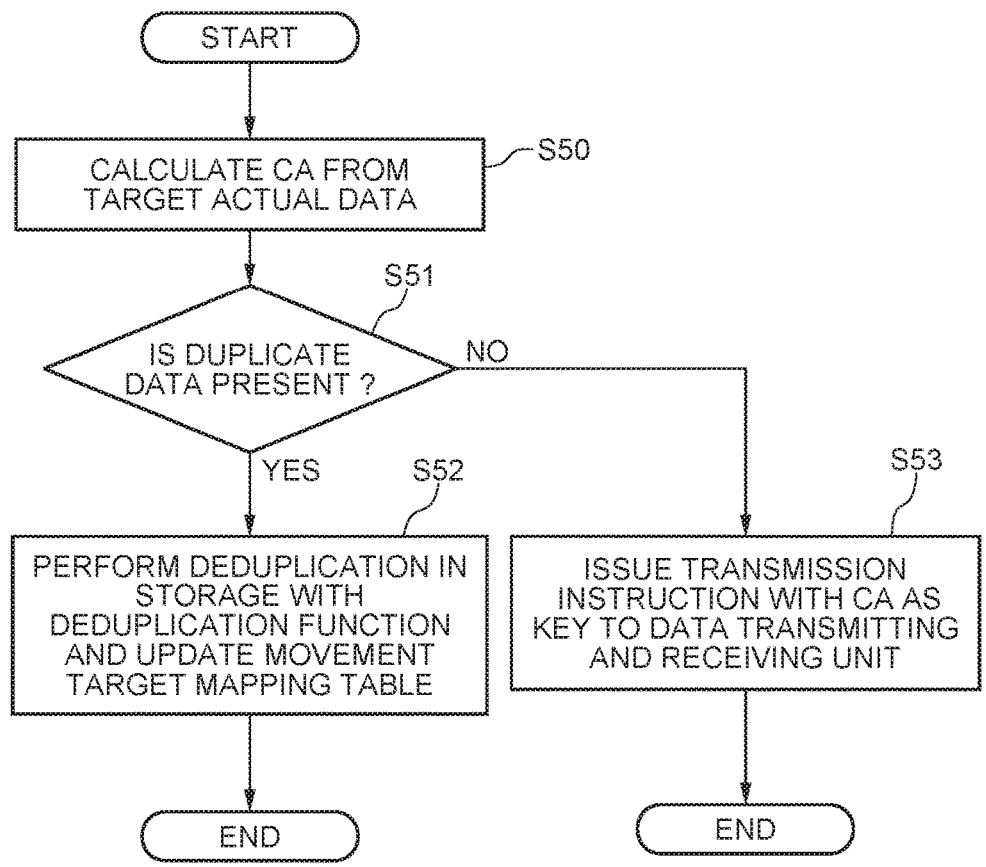
FIG. 17 is a flowchart showing the operation of the deduplication unit in the second exemplary embodiment of the present invention.

FIG. 17 is a flowchart showing part of the operation of the deduplication unit 220. Below, an operation of the deduplication unit 220 to execute a deduplication process in accordance with a CAS Instruction from the hierarchy changing unit 230 (step S72) will be described referring to FIG. 17.

The deduplication unit 220 first acquires actual data on which the CAS Instruction has been issued by the hierarchy changing unit 230 with reference to the hierarchy-1 mapping table 321. In other words, the deduplication unit 220 acquires a line having a hierarchy address of the hierarchy 1 contained by the CAS Instruction from the hierarchy-1 mapping table 321, and acquires data stored in a device address of the line from the hierarchy-1 physical device. Next, the deduplication unit 220 calculates the hash of actual data as a CA by a predetermined calculation method (step S50). In a case where the CA has already been calculated and entered on the acquired line, the calculation may be omitted. Next, the deduplication unit 220 checks whether or not duplicate data is present in the storage by using the calculated CA and, in a case where duplicate data is present (YES at step S51), performs deduplication in the storage 1 with deduplication, and updates the hierarchy-1 mapping table 321 and the external storage hierarchy mapping table 322 (step S52). Then, the deduplication unit 220 ends the process shown in FIG. 17. On the other hand, in a case where duplicate data is not present as a result of checking whether or not duplicate data is present in the storage by using the calculated CA (NO at step S51), the deduplication unit 220 issues a transmission instruction with the CA as a key to the data transmitting and receiving unit 210 (step S53). Then, the deduplication unit 220 ends the process shown in FIG. 17.

Figure 18:
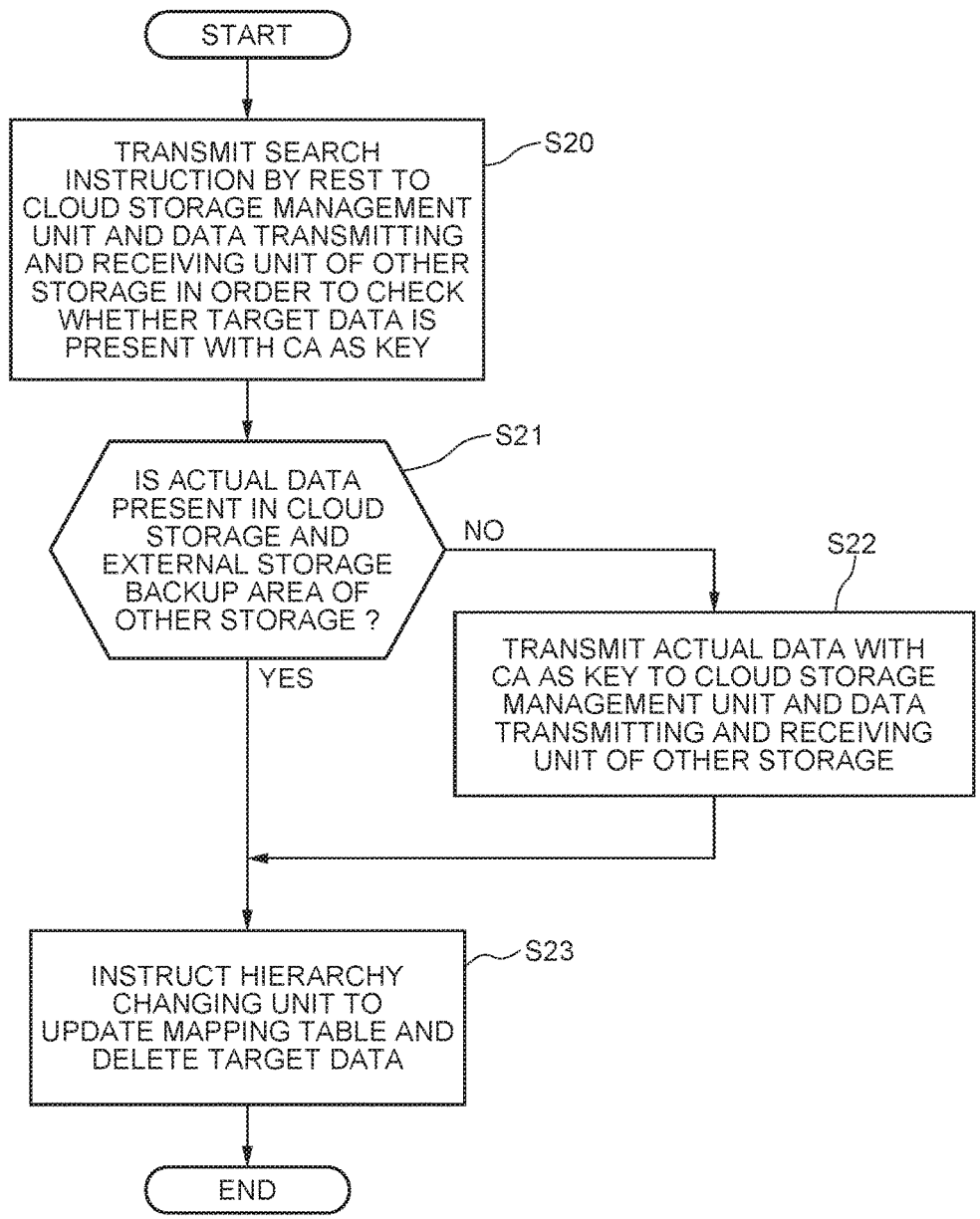
FIG. 18 is a flowchart showing the operation of a data transmitting and receiving unit in the second exemplary embodiment of the present invention.

FIG. 18 is a flowchart showing the operation of the data transmitting and receiving unit 210. Below, an operation of the data transmitting and receiving unit 210 to receive a transmission instruction from the deduplication unit 220 (step S53) will be described referring to FIG. 18.

Upon receiving a transmission instruction from the deduplication unit 220, the data transmitting and receiving unit 210 first transmits, to the cloud storage management unit 250 and the data transmitting and receiving unit 211 of the other storage 3, a search instruction, for example, by REST (REpresentational State Transfer) in order to search for target data with a CA as key (step S20). Next, in a case where identical data is not present as a result of the search (NO at step S21), the data transmitting and receiving unit 210 transmits actual data with the CA as key to the cloud storage management unit 250 and the data transmitting and receiving unit 211 of the other storage 3 (step S22). The data transmitting and receiving unit 210 then proceeds to step S23. On the other hand, in a case where identical data is present as a result of the search (YES at step S21), the data transmitting and receiving unit 210 skips step S22 and proceeds to step S23.

At step S23, the data transmitting and receiving unit 210 instructs the hierarchy changing unit 230 to update the LD mapping table 300, the hierarchy-1 mapping table 321 and the external storage hierarchy mapping table 322 and delete the target data (step S23). The data transmitting and receiving unit 210 then ends the process shown in FIG. 18. Upon receiving the instruction at step S23, the hierarchy changing unit 230 executes steps S73 and S74 of FIG. 16 described before.

Thus, the data transmitting and receiving unit 210 performs the operation to transmit data with decreased access frequency to the cloud storage 2 by using a REST interface. In this exemplary embodiment, this operation is performed when the deduplication unit 220 executed on the basis of the CAS Instruction regularly issued by the hierarchy changing unit 230, in a case where data has not been deduplicated in the storage, issues a data transmission instruction to the data transmitting and receiving unit 210.

Figure 19:
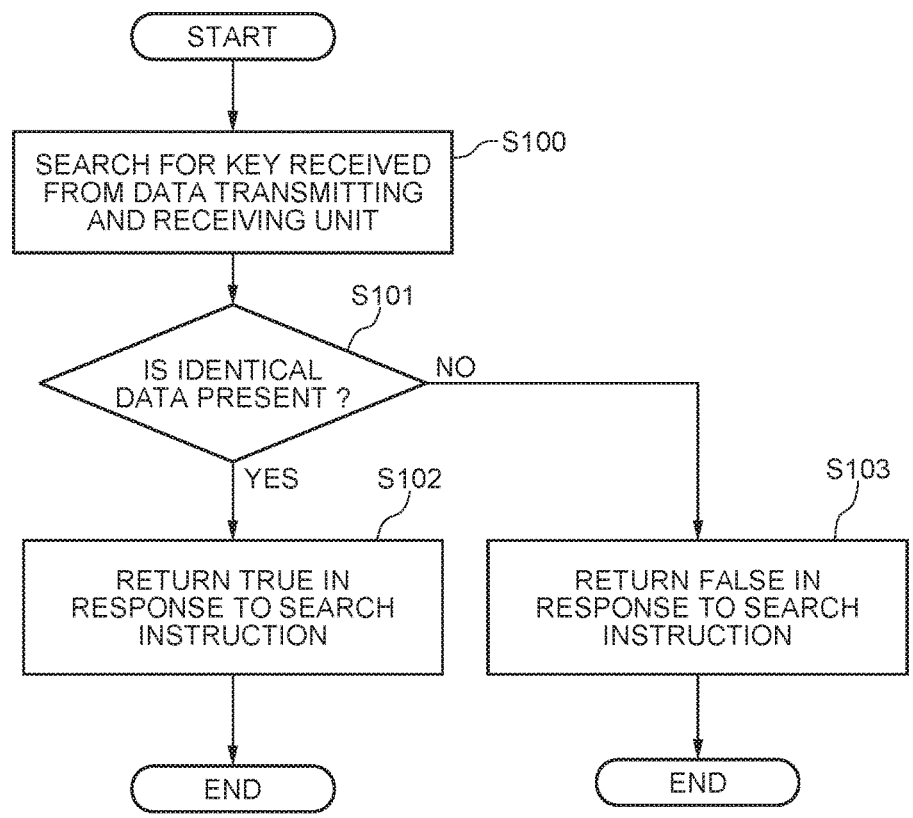
FIG. 19 is a flowchart showing the operation of a cloud storage management unit in the second exemplary embodiment of the present invention.

FIG. 19 is a flowchart showing part of the operation of the cloud storage management unit 250. Below, an operation of the cloud storage management unit 250 to receive a search instruction from the data transmitting and receiving unit 210 (step S20 of FIG. 18) will be described referring to FIG. 19.

The cloud storage management unit 250 first searches the device 81 for identical data with CA contained in the search instruction received from the data transmitting and receiving unit 210 (data having the same CA as the CA contained in the search instruction) (step S100). Next, in a case where identical data is present (YES at step S101), the cloud storage management unit 250 returns true to the data transmitting and receiving unit 210 (step S102), and ends the process. On the other hand, in a case where identical data is not present (NO at step S101), the cloud storage management unit 250 returns false to the data transmitting and receiving unit 210 (step S103), and ends the process.

Figure 20:
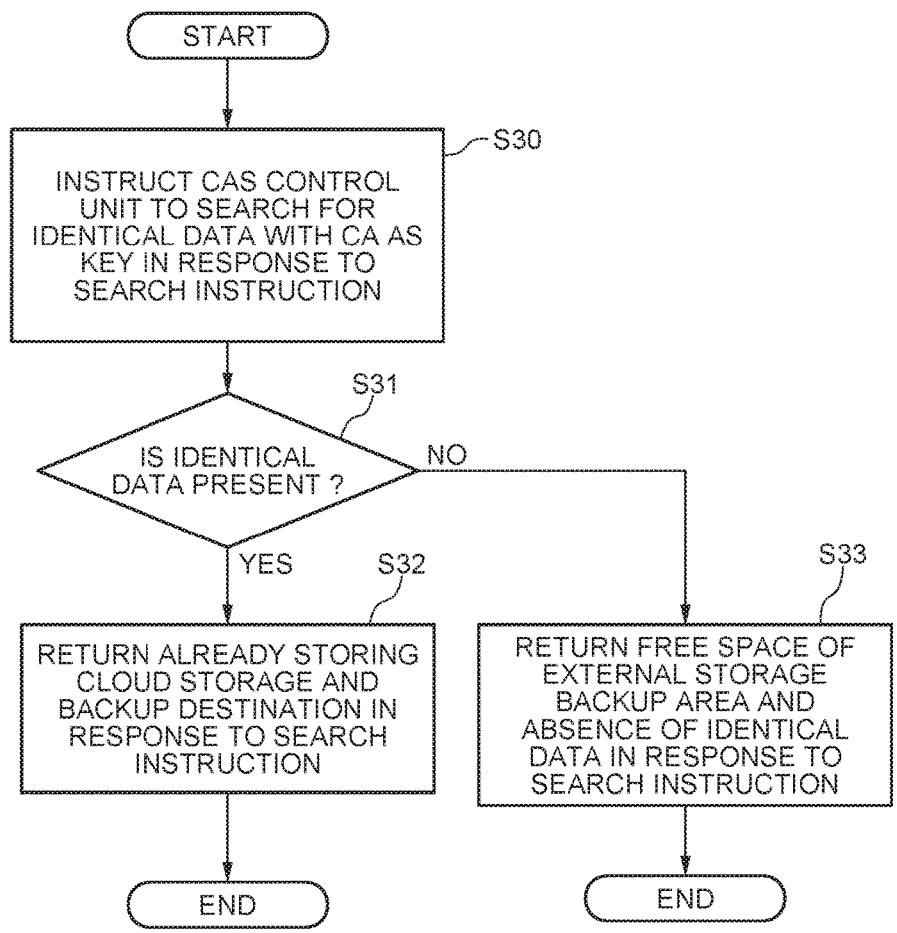
FIG. 20 is a flowchart showing the operation of the data transmitting and receiving unit in the second exemplary embodiment of the present invention.

FIG. 20 is a flowchart showing part of the operation of the data transmitting and receiving unit 211. Below, an operation of the data transmitting and receiving unit 211 upon receiving a search instruction from the data transmitting and receiving unit 210 of the storage 1 (step S20 of FIG. 18) will be described referring to FIG. 20.

Upon receiving a search instruction from the data transmitting and receiving unit 210 of the storage 1, the data transmitting and receiving unit 211 of the storage 3 instructs the CAS control unit 241 to search the external storage backup area 71 for identical data with CA contained in the search instruction as key (data having the same CA as the CA contained in the search instruction) (step S30). Next, in a case where identical data is present as a result of the search (YES at step S31), in response to the search instruction, the data transmitting and receiving unit 211 returns information of the already storing cloud storage and the storage with the deduplication function where backup is stored (step S32), and ends the process. On the other hand, in a case where identical data is not present as a result of the search (NO at step S31), in response to the search instruction, the data transmitting and receiving unit 211 returns the free space of the external storage backup area 71 and absence of identical data (step S33), and ends the process. By thus returning the free space of the external storage backup area 71, it is possible to prevent backup of data exceeding the free space.

As described above, the data transmitting and receiving unit 211 of the storage 3 receives a duplicate data search instruction from the storage 1 by using the REST interface. Then, in response to the search instruction with CA as key from the data transmitting and receiving unit 210 of the storage 1, the data transmitting and receiving unit 211 issues a search instruction to the CAS control unit 241 and returns the result.

Figure 21:
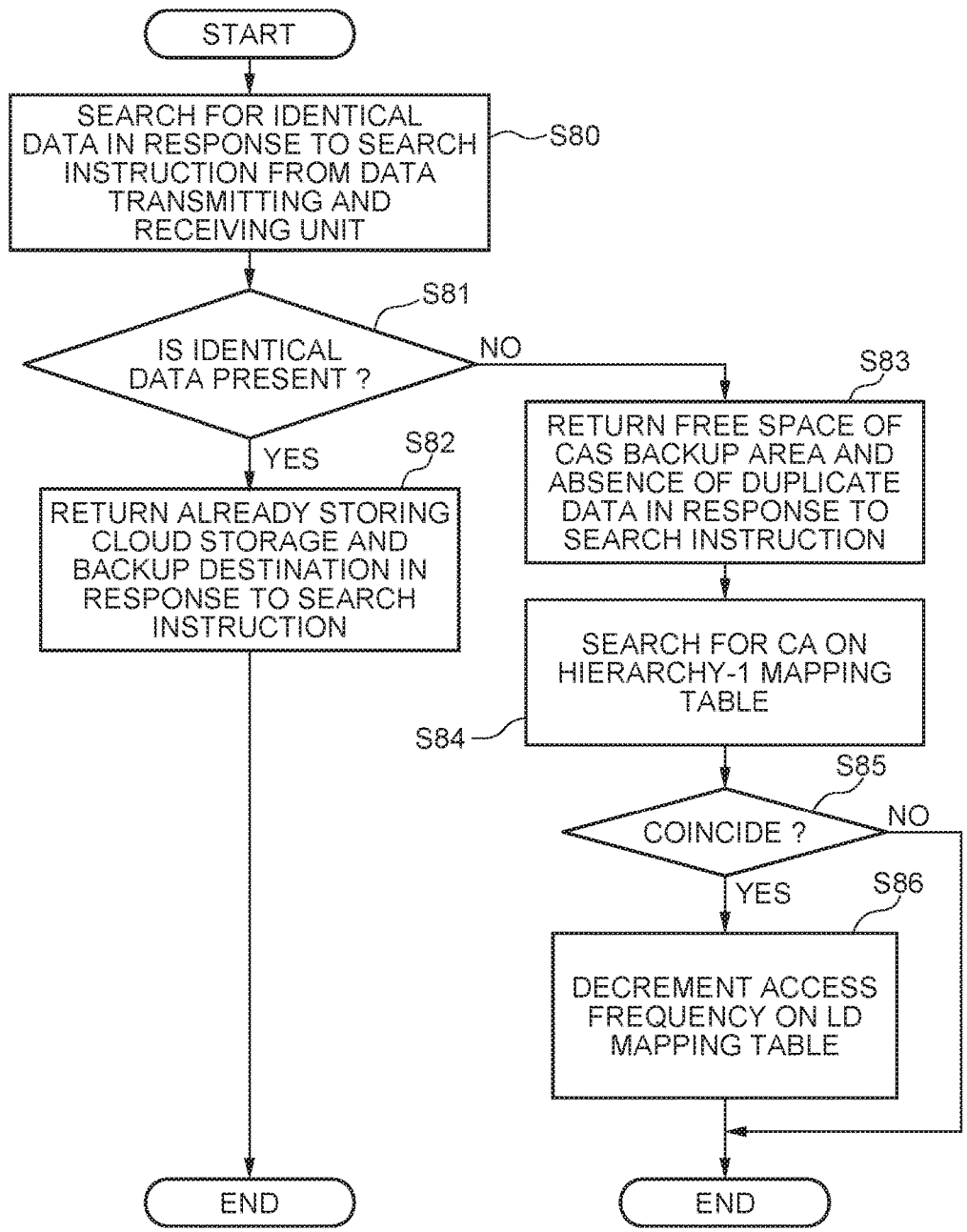
FIG. 21 is a flowchart showing the operation of a CAS control unit in the second exemplary embodiment of the present invention.

FIG. 21 is a flowchart showing part of the operation of the CAS control unit 241. Below, an operation of the CAS control unit 241 to receive a search instruction from the data transmitting and receiving unit 211 (step S30 of FIG. 20) will be described referring to FIG. 21.

Upon receiving a search instruction from the data transmitting and receiving unit 211, the CAS control unit 241 first searches the external storage backup area 71 for identical data (data having the same CA as CA contained in the search instruction) with CA contained in the search instruction as key (step S80). Next, in a case where identical data is present (YES at step S81), the CAS control unit 241 returns information of the already storing cloud storage and the backup destination storage to the data transmitting and receiving unit 211 (step S82), and ends the process.

On the other hand, in a case where identical data is not present (NO at step S81), the CAS control unit 241 returns information of the free space of the external storage backup area 71 and absence of identical data to the data transmitting and receiving unit 211 (step S83). Subsequently, the CAS control unit 241 refers to the hierarchy-1 mapping table 321 of the storage 3, and searches for data having a CA which coincides with the CA contained in the search instruction (step S84). Next, in a case where data having the coincident CA is present (YES at step S85), the CAS control unit 241 decrements the access frequency of the abovementioned data in the LD mapping table 300 of the storage 3 in order to preferentially convert the abovementioned data into an object and manage (step S86), and ends the process. In a case where data having the coincident CA is not present (NO at step S85), the CAS control unit 241 skips step S86 and ends the process.

Figure 22:
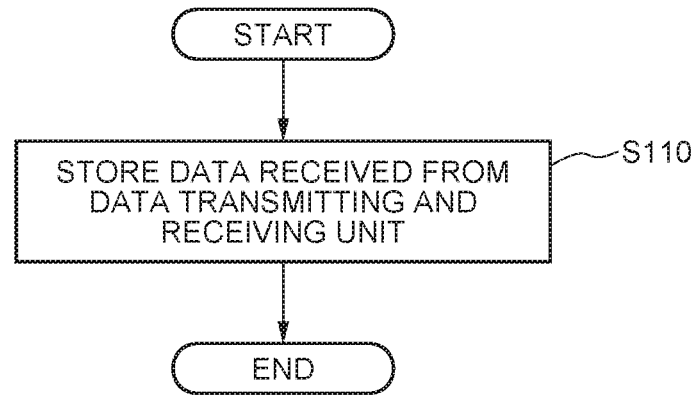
FIG. 22 is a flowchart showing the operation of the cloud storage management unit in the second exemplary embodiment of the present invention.

FIG. 22 is a flowchart showing part of the operation of the cloud storage management unit 250. Below, an operation of the cloud storage management unit 250 upon receiving actual data with a CA transmitted from the data transmitting and receiving unit 210 as a key (step S22 of FIG. 18) will be described referring to FIG. 22.

The cloud storage management unit 250 associates the data received from the data transmitting and receiving unit 210 with the CA and stores the data into the cloud data storage destination device 81 (step S110), and ends the process.

Figure 23:
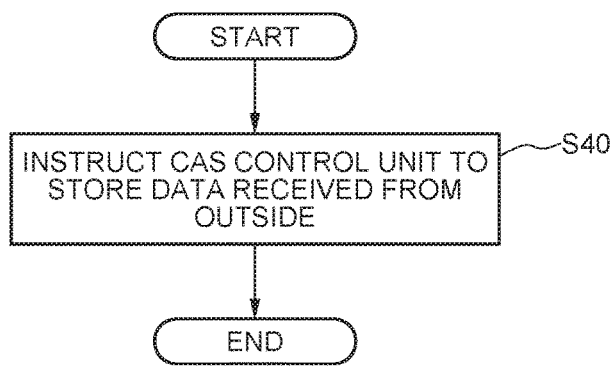
FIG. 23 is a flowchart showing the operation of the data transmitting and receiving unit in the second exemplary embodiment of the present invention.

FIG. 23 is a flowchart showing part of the operation of the data transmitting and receiving unit 211. Below, an operation of the data transmitting and receiving unit 211 when receiving actual data with a CA transmitted from the data transmitting and receiving unit 210 as a key (step S22 of FIG. 18) will be described with reference to FIG. 23.

Upon receiving the actual data with the CA transmitted from the data transmitting and receiving unit 210 as a key, the data transmitting and receiving unit 211 instructs the CAS control unit 241 to store the received data (step S40), and ends the process.

Thus, the data transmitting and receiving unit 211 receives an instruction to store identical data (duplicate data) from the storage 1 by utilizing the REST interface. Then, in response to the data storage instruction with the CA from the data transmitting and receiving unit 210 of the storage 1 as a key, the data transmitting and receiving unit 211 issues a data storage instruction to the CAS control unit 241, and returns a result from the CAS control unit 241

Figure 24:
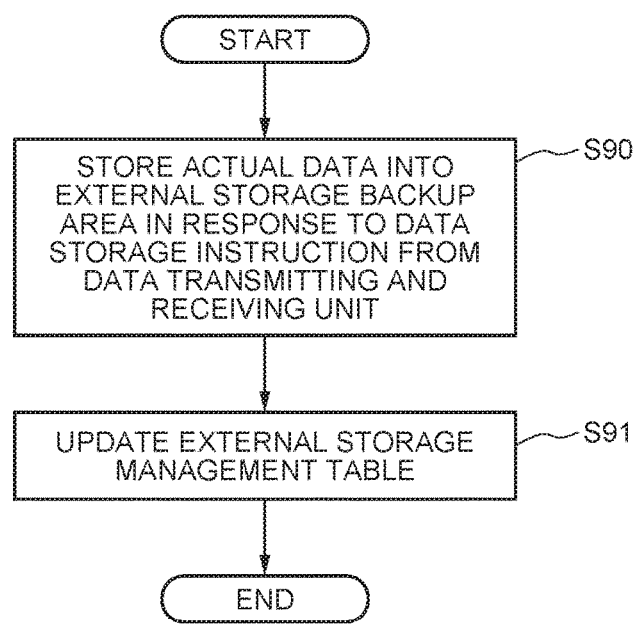
FIG. 24 is a flowchart showing the operation of the CAS control unit in the second exemplary embodiment of the present invention.

FIG. 24 is a flowchart showing part of the operation of the CAS control unit 241. Below, an operation of the CAS control unit 241 when receiving a data storage instruction from the data transmitting and receiving unit 211 will be described with reference to FIG. 24.

The CAS control unit 241 first stores actual data into the external storage backup area 71 (step S90). Next, the CAS control unit 241 adds a new entry having a CA and the storage name of a transmission source disk array to the external storage management table 331 (step S91), and ends the process.

<Description of Effect of This Exemplary Embodiment>

By holding deduplicated data in the CAS structure in the lowest hierarchy of the block storage and placing actual data in the cloud storage 2, it is possible to provide user capacity exceeding the specifications of the storage device of the storage 1 and expect increase of a deduplication ratio.

According to this exemplary embodiment, duplicate data in the storage 1 and 3 with the deduplication function can be deduplicated even when stored into the cloud storage 2. Therefore, the storage cost of the cloud storage 2 can be reduced. Moreover, duplicate data of data already stored in the cloud storage 2 is not transmitted to the cloud storage 2, so that communication cost can be reduced.

Further, according to this exemplary embodiment, the plurality of external storage backup areas 70 and 71 having equivalent functions located on the local site are able to hold one or more backup data. In other words, backup data of data evicted from the storage 1 to the cloud storage 2 is held by the external storage backup area 71 of the storage 3 cooperating with the storage 1. Therefore, it is possible to provide an alternative unit in case the cloud storage 2 cannot be used, and it is possible to increase the level of service because availability increases.

Further, according to this exemplary embodiment, when storing backup data of data evicted from the storage 1 to the cloud storage 2 into the external storage backup area 71 of the storage 3, if identical data is present in the hierarchy-1 mapping table of the storage 3, the storage 3 decreases the access frequency of the identical data. Thus, it is possible to preferentially make the identical data to be the target of deduplication. Therefore, the deduplication ratio increases, and the storage cost of the storage can be reduced.

In other words, according to this exemplary embodiment, by placing a backup in the external storage located on the local site, increase of availability and increase of the deduplication ratio can be expected.

[Third Exemplary Embodiment]

Figure 25:
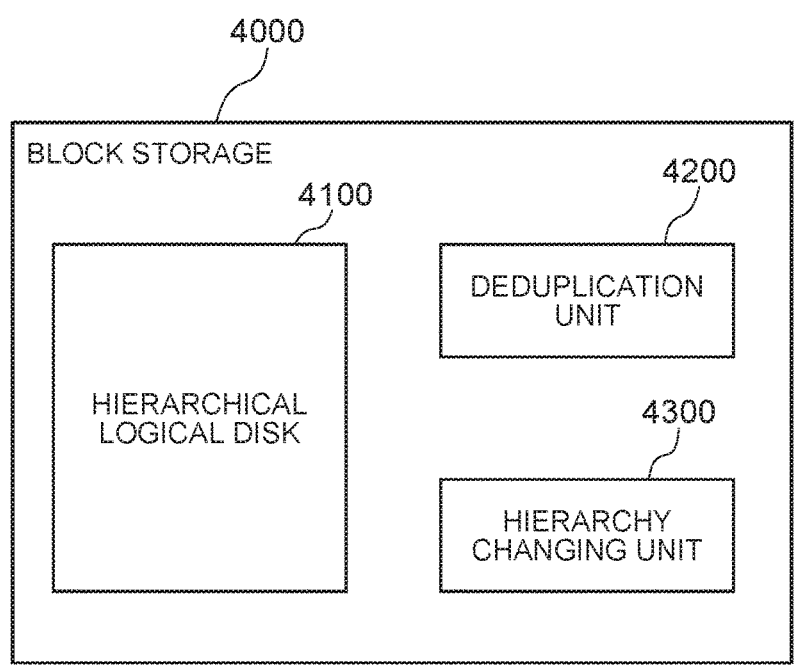
FIG. 25 is a block diagram of block storage according to a third exemplary embodiment.

Referring to FIG. 25, block storage 4000 according to a third exemplary embodiment of the present invention has a hierarchical logical disk 4100, a deduplication unit 4200, and a hierarchy changing unit 4300. The block storage 4000 is accessed by a first host computer (not shown in the drawing). Moreover, the block storage 4000 is connected via a network to object storage (not shown in the drawing) shared with other block storage (not shown in the drawings) accessed by a second host computer (not shown in the drawing). Moreover, the block storage 4000 includes a plurality of kinds of physical devices (not shown in the drawing) with different access response performances.

The hierarchical logical disk 4100 is composed of a plurality of logical blocks. The hierarchical logical disk 4100 is created by using the storage areas of the plurality of kinds of physical devices and the storage area of the object storage, with the object storage as the lowest hierarchy and the plurality of kinds of physical devices as a plurality of hierarchies higher than the lowest hierarchy.

The deduplication unit 4200 has a function to, when the access frequency of a logical block stored in a hierarchy one level above the lowest hierarchy falls below a threshold, search the object storage for a logical block having the hash of the abovementioned logical block as a content address.

The hierarchy changing unit 4300 has a function to, when the search by the deduplication unit 4200 has failed, transmit the logical block to the object storage and change a hierarchy to store the logical block to the lowest hierarchy. Moreover, the deduplication unit 4200 has a function to, when the search by the deduplication unit 4200 has succeeded, omit the transmission and change a hierarchy to store the logical block to the lowest hierarchy.

The block storage 4000 according to this exemplary embodiment having the configuration as described above operates in the following manner.

The deduplication unit 4200, for example, regularly detects whether or not the access frequency of a logical block stored in the hierarchy one level above the lowest hierarchy has fallen below a threshold. Then, the deduplication unit 4200 searches the object storage located in the lowest hierarchy for a logical block having the hash of the logical block with access frequency having fallen below the threshold, as a content address.

When the search by the deduplication unit 4200 has failed, the hierarchy changing unit 4300 transmits the logical block to the object storage, and changes a hierarchy to store the logical block to the lowest hierarchy. When the search by the deduplication unit 4200 has succeeded, the hierarchy changing unit 4300 omits the transmission, and changes a hierarchy to store the logical block to the lowest hierarchy.

Thus, according to this exemplary embodiment, in the case of sharing the object storage among a plurality of block storage, it is possible to prevent the same data of the plurality of block storage from being duplicated and stored.

This is because this exemplary embodiment includes the deduplication unit 4200 which, when the access frequency of a logical block stored in the hierarchy one level above the lowest hierarchy falls below the threshold, searches the object storage located in the lowest hierarchy for a logical block having the hash of the abovementioned logical block as a content address, and the hierarchy changing unit 4300 which, when the search fails, transmits the logical block to the object storage and change a hierarchy to store the logical block to the lowest hierarchy and, when the search succeeds, omits the transmission and changes a hierarchy to store the logical block to the lowest hierarchy.

[Fourth Exemplary Embodiment]

Figure 26:
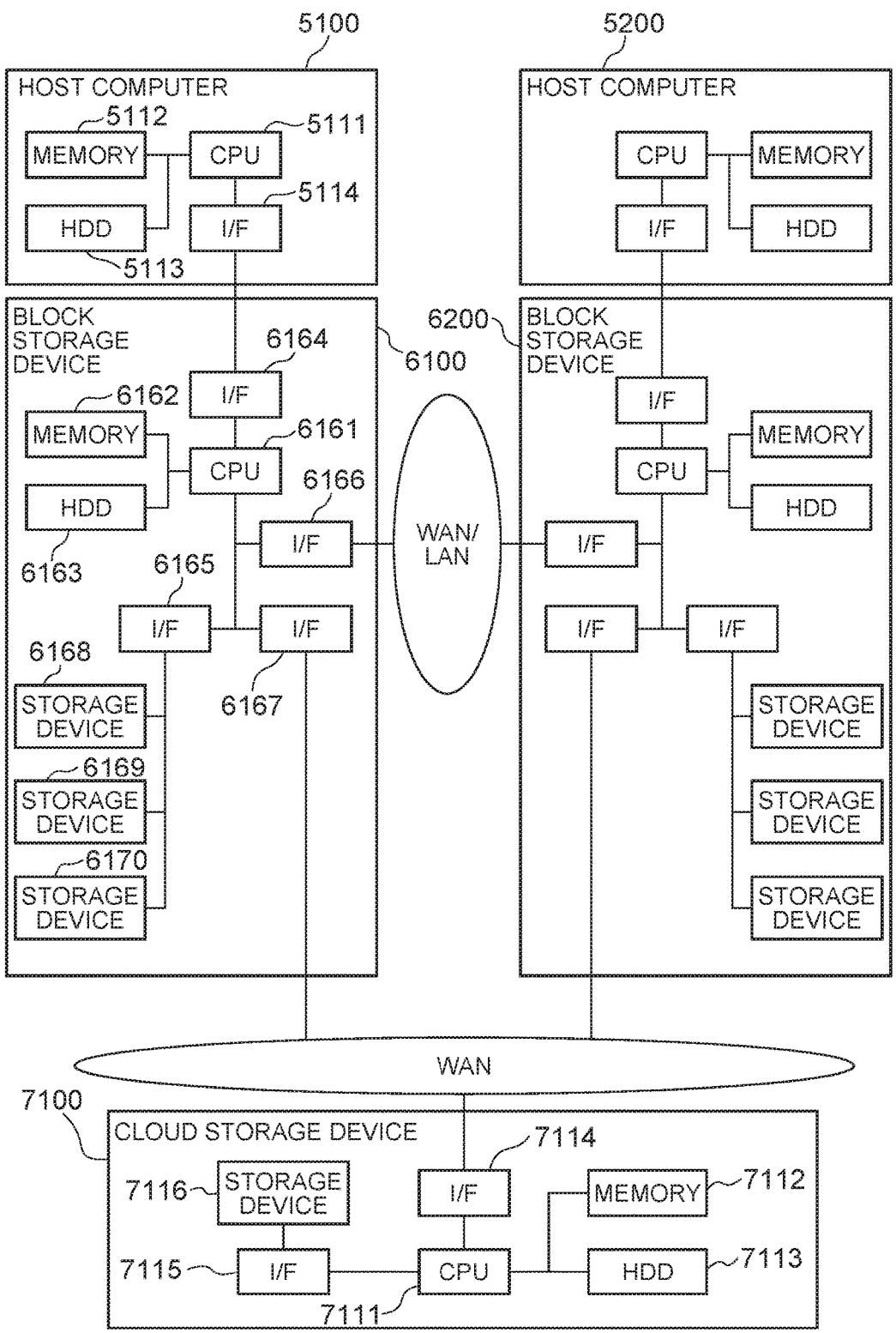
FIG. 26 is a block diagram showing an example of a hardware configuration of a computer system according to a fourth exemplary embodiment of the present invention.

In this exemplary embodiment, the hardware configuration of a computer system of the present invention will be described. FIG. 26 is a block diagram showing an example of the hardware configuration of the computer system of the present invention.

Referring to FIG. 26, block storage 6100 includes: a CPU 6161; a memory 6162, a HDD 6163 and interface controllers 6164 to 6167 which are connected to the CPU 6161; and storage devices 6168 to 6170 connected to the CPU 6161 via the interface controller 6165.

The storage devices 6168 and 6169 are physical disks (physical devices) used for a hierarchical logical disk. The storage device 6168 has better access response performance than the storage device 6169. The storage device 6168 is used as a hierarchy-0 physical disk, and the storage device 6169 is used as a hierarchy-1 physical disk. For example, the storage device 6168 is formed of SSD, and the storage device 6169 is formed of SAS storage. The storage device 6170 is a physical disk used for an external storage backup area. Meanwhile, part of the storage area of the storage device 6168 or the storage device 6169 may be assigned to the external storage backup area.

The interface controller 6164 controls data transfer between the CPU 6161 of the block storage 6100 and a host computer 5100 via a host interface bus such as FC, iSCSI and SAS. The interface controller 6165 controls data transfer between the CPU 6161 of the block storage 6100 and the storage devices 6168 to 6170 via a storage interface bus such as FC, iSCSI and SAS. The interface controller 6166 controls data transfer between the CPU 6161 of the block storage 6100 and block storage 6200 via a network such as WAN. The interface controller 6167 controls data transfer between the CPU 6161 of the block storage 6100 and cloud storage 7100 via a network such as WAN and LAN.

The memory 6162 is a volatile memory which is rewritable, such as DRAM. Part of the memory 6162 is used to store an operating system (OS) and various kinds of programs loaded from the HDD 6163. Other part of the memory 6162 is used as a work area for the CPU 6161. In the HDD 6163, the OS and various kinds programs are stored. When the block storage 6100 is started, the CPU 6161 executes IPL stored in a nonvolatile memory such as ROM, thereby loading the OS stored in the HDD 6163 to the memory 6162. Moreover, the CPU 6161 loads the program stored in the HDD 6163 to the memory 6162. The CPU 6161 functions as a predetermined function part in accordance with the program and OS loaded to the memory 6162. That is, the CPU 6161 functions as the deduplication unit 2120, the hierarchy changing unit 2130, and the backup control unit 2140 in the exemplary embodiment shown in FIG. 1. Further, the CPU 6161 functions as the access frequency update unit 200, the data transmitting and receiving unit 210, the deduplication unit 220, the hierarchy changing unit 230, and the CAS control unit 240 in the exemplary embodiment shown in FIG. 6. Furthermore, the CPU 6161 functions as the deduplication unit 4200 and the hierarchy changing unit 4300 in the exemplary embodiment shown in FIG. 25.

Referring to FIG. 26, the host computer 5100 includes: a CPU 5111; and a memory 5112, a HDD 5113 and an interface controller 5114 which are connected to the CPU 5111. The interface controller 5114 controls data transfer with the block storage 6100. The memory 5112 is a volatile memory which is rewritable, such as DRAM. Part of the memory 5112 is used to store an operating system (OS) and various kinds of programs loaded from the HDD 5113. Other part of the memory 5112 is used as a work area for the CPU 5111. In the HDD 5113, the OS and various kinds programs are stored. The various kinds of programs include an application program and a utility program.

Referring to FIG. 26, cloud storage 7100 includes: a CPU 7111; and a memory 7112, a HDD 7113, interface controllers 7114 and 7115, and a storage device 7116 which are connected to the CPU 7111 via the interface controller 7115. The interface controller 7114 controls data transfer between the CPU 7111 of the cloud storage 7100 and the block storage 6100, 6200 via a network such as WAN. The interface controller 7115 controls data transfer between the CPU 7111 of the cloud storage 7100 and the storage device 7116. The memory 7112 is a volatile memory which is rewritable, such as a DRAM. Part of the memory 7112 is used to store an operating system (OS) and various kinds of programs loaded from the HDD 7113. Other part of the memory 7112 is used as a work area for the CPU 7111. In the HDD 7113, the OS and various kinds of programs are stored. The various kinds of programs include an application program and a utility program. When the cloud storage 7100 is started, the CPU 7111 executes IPL stored in a nonvolatile memory such as ROM, thereby loading the OS stored in the HDD 7113 to the memory 7112. Moreover, the CPU 7111 loads the program stored in the HDD 7113 to the memory 7112. The CPU 7111 functions as a predetermined function part in accordance with the program and OS loaded to the memory 7112. That is, the CPU 7111 functions as the cloud storage management unit 250 in the exemplary embodiment shown in FIG. 6.

Referring to FIG. 26, a host computer 5200 has the same configuration as the host computer 5100. Block storage 6200 has the same configuration as the block storage 6100.

Although the present invention has been described with reference to the exemplary embodiments, the present invention is not limited by the exemplary embodiments. The configuration and detail of the present invention can be changed in various manners that can be understood by those skilled in the art.

The present invention can be applied to a disk array device.

DESCRIPTION OF REFERENCE NUMERALS 1 storage with deduplication function
2 cloud storage
3 storage with deduplication function
50, 51 hierarchical logical disk
60 hierarchical device
70, 71 external storage backup area
80, 82 storage destination device
81 cloud data storage destination device
200 access frequency update unit
210, 211 data transmitting and receiving unit
220 deduplication unit
230 hierarchy changing unit
240, 241 CAS control unit
250 cloud storage management unit
300 LD mapping table
310 hierarchy management table
320 hierarchy-0 mapping table
321 hierarchy-1 mapping table
322 external storage hierarchy mapping table
330, 331 external storage management table
1100 host computer
1200 host computer
2100 block storage
2110 hierarchical logical disk
2111 logical disk (hierarchy 0)
2112 logical disk (hierarchy 1)
2113 logical disk (hierarchy 2)
2120 deduplication unit 2130 hierarchy changing unit
2140 backup control unit
2150 external storage backup area
1100 host computer
1200 host computer
2200 block storage
2210 hierarchical logical disk
2211 logical disk (hierarchy 0)
2212 logical disk (hierarchy 1)
2213 logical disk (hierarchy 2)
2220 deduplication unit
2230 hierarchy changing unit
2240 backup control unit
2250 external storage backup area
3100 object storage
4000 block storage
4100 hierarchical logical disk
4200 deduplication unit
4300 hierarchy changing unit
5100 host computer
5111 CPU
5112 memory
5113 HDD
5114 interface controller
5200 host computer
6100 block storage
6161 CPU
6162 memory
6163 HDD
6164 interface controller
6165 interface controller
6166 interface controller
6167 interface controller
6168 storage device
6169 storage device
6170 storage device
6200 block storage
7100 cloud storage
7111 CPU
7112 memory
7113 HDD
7114 interface controller
7115 interface controller
7116 storage device

The invention claimed is:

1. A storage system comprising:
a first block storage device accessed by a first host computer, and a second block storage device accessed by a second host computer, the first block storage device and the second block storage device sharing an object storage device having a content addressable storage (CAS) function of providing a cloud service, wherein
the first block storage device includes:
a first hierarchical logical disk composed of a plurality of first logical blocks and created by using storage areas of plural kinds of first physical devices and a storage area of the object storage device, with the object storage device as a lowest hierarchy and the plural kinds of first physical devices having different access response performances as a plurality of hierarchies above the lowest hierarchy;
a first deduplication unit configured to, when access frequency of a first logical block stored in a hierarchy one level above the lowest hierarchy is reduced to fall below a threshold, do a search of the object storage device for a logical block having a hash of the first logical block as a content address; and
a first hierarchy changing unit configured to, when the search by the first deduplication unit fails, perform transmission of the first logical block to the object storage device for storing the first logical block in the object storage device and thereby change a hierarchy to store the first logical block to the lowest hierarchy, whereas when the search by the first deduplication unit succeeds, omit the transmission and change a hierarchy to store the first logical block to the lowest hierarchy, and
the second block storage device includes:
a second hierarchical logical disk composed of a plurality of second logical blocks and created by using storage areas of plural kinds of second physical devices and a storage area of the object storage device, with the object storage device as a lowest hierarchy and the plural kinds of second physical devices having different access response performances as a plurality of hierarchies above the lowest hierarchy;
a second deduplication unit configured to, when access frequency of a second logical block stored in a hierarchy one level above the lowest hierarchy is reduced to fall below the threshold, do a search of the object storage device for a logical block having a hash of the second logical block as a content address; and
a second hierarchy changing unit configured to, when the search by the second deduplication unit fails, perform transmission of the second logical block to the object storage device for storing the second logical block in the object storage device and thereby change a hierarchy to store the second logical block to the lowest hierarchy, whereas when the search by the second deduplication unit succeeds, omit the transmission and change a hierarchy to store the second logical block to the lowest hierarchy.

2. The storage system according to claim 1, wherein:
the second block storage device has:
a first backup area corresponding to the lowest hierarchy of the first hierarchical logical disk; and
a first backup control unit configured to, upon receiving a search request designating a content address from the first block storage device, do a search of the first backup area for a logical block having the content address, return a search result to the first block storage device, and store a logical block received from the first block storage device into the first backup area with use of the hash of the logical block as a content address;
the first deduplication unit is configured to transmit a search request to the second block storage device and thereby do a search of the first backup area for a logical block having the content address; and
the first hierarchy changing unit is configured to, when the search of the first backup area by the first deduplication unit fails, transmit the logical block to the second block storage device in order to store the logical block into the first backup area.

3. The storage system according to claim 2, wherein:
the first block storage device has:
a second backup area corresponding to the lowest hierarchy of the second hierarchical logical disk; and
a second backup control unit configured to, upon receiving a search request designating a content address from the second block storage device, do a search of the second backup area for a logical block having the content address, return a search result to the second block storage device, and store a logical block received from the second block storage device into the second backup area with use of the hash of the logical block as a content address;

the second deduplication unit is configured to transmit a search request to the first block storage device and thereby do a search of the second backup area for the logical block having the content address; and the second hierarchy changing unit is configured to, when the search of the second backup area by the second deduplication unit fails, transmit the logical block to the first block storage device in order to store the logical block into the second backup area.

4. The storage system according to claim 2, wherein the first backup control unit is configured to, when the search of the first backup area for the logical block fails, search for a second logical block which is stored in the hierarchy one level above the lowest hierarchy of the second hierarchical logical disk and in which the hash of the second logical block matches the content address of the logical block that the search fails, and decrease access frequency of the second logical block found through the search.

5. A data management method in a storage system, the storage system including a first block storage device accessed by a first host computer, and a second block storage device accessed by a second host computer, the first block storage device and the second block storage device sharing an object storage device having a content addressable storage (CAS) function of providing a cloud service, the first block storage device including a first hierarchical logical disk composed of a plurality of first logical blocks and created by using storage areas of plural kinds of first physical devices and a storage area of the object storage device, with the object storage device as a lowest hierarchy and the plural kinds of first physical devices having different access response performances as a plurality of hierarchies above the lowest hierarchy, the second block storage device including a second hierarchical logical disk composed of a plurality of second logical blocks and created by using storage areas of plural kinds of the second physical devices having different access response performances and a storage area of the object storage device, with the object storage device as a lowest hierarchy and the plural kinds of second physical devices as a plurality of hierarchies above the lowest hierarchy, the method comprising:

by the first block storage device, when access frequency of a first logical block stored in a hierarchy one level above the lowest hierarchy is reduced to fall below a threshold, doing a search of the object storage device for a logical block having a hash of the first logical block as a content address;

when the search fails, performing transmission of the first logical block to the object storage device to store the first logical block in the object storage device and thereby changing a hierarchy to store the first logical block to the lowest hierarchy; and when the search succeeds, omitting the transmission of the first logical block to the object storage device and change a hierarchy to store the first logical block to the lowest hierarchy.

6. The method according to claim 5, wherein the second block storage device has a first backup area corresponding to the lowest hierarchy of the first hierarchical logical disk, and the method further comprises:

by the first block storage device, transmitting a search request to the second block storage device and thereby doing a search of the first backup area for a first logical block having the content address; and when the search of the first backup area fails, transmitting the first logical block to the second block storage device in order to store the first logical block into the first backup area.

7. The method according to claim 6, wherein the first block storage device has a second backup area corresponding to the lowest hierarchy of the second hierarchical logical disk, and the method further comprises:

by the second block storage device, transmitting a search request to the first block storage device and thereby doing a search of the second backup area for a second logical block having the content address; and when the search of the second backup area fails, transmitting the second logical block to the first block storage device in order to store the second logical block into the second backup area.

8. The method according to claim 6, further comprising:

by the second block storage device, when the search of the first backup area for the logical block fails, doing a search for a second logical block which is stored in the hierarchy one level above the lowest hierarchy of the second hierarchical logical disk and in which the hash of the second logical block matches the content address of the logical block that the search fails, and decreasing access frequency of the second logical block found through the search.

* * * * *

UNITED STATES PATENT AND TRADEMARK OFFICE
CERTIFICATE OF CORRECTION

PATENT NO. : 10,185,495 B2
APPLICATION NO. : 15/409052
DATED : January 22, 2019
INVENTOR(S) : Yoshiyuki Katsuki Page 1 of 1

It is certified that error appears in the above-identified patent and that said Letters Patent is hereby corrected as shown below:

In the Claims

Column 25, Line 45; In Claim 5, after "of", delete "the"

Signed and Sealed this
Fourth Day of June, 2019

Andrei Iancu
*Director of the United States Patent and Trademark Office*